United States Patent
Shekhar et al.

(10) Patent No.: US 11,416,809 B1
(45) Date of Patent: Aug. 16, 2022

(54) SYSTEM AND METHOD OF ROOT CAUSE ANALYSIS OF OBJECTIVE VIOLATIONS AND QUERY ANALYSIS

(71) Applicant: JDA Software Group, Inc., Scottsdale, AZ (US)

(72) Inventors: Tushar Shekhar, Katihar (IN); Narasimha Kamath, Bangalore (IN)

(73) Assignee: Blue Yonder Group, Inc., Scottsdale, AZ (US)

(\*) Notice: Subject to any disclaimer, the term of this patent is extended or adjusted under 35 U.S.C. 154(b) by 865 days.

(21) Appl. No.: 15/177,223

(22) Filed: Jun. 8, 2016

Related U.S. Application Data

(63) Continuation-in-part of application No. 14/738,546, filed on Jun. 12, 2015.

(60) Provisional application No. 62/174,577, filed on Jun. 12, 2015.

(51) Int. Cl.
*G06Q 10/08* (2012.01)
*G06Q 10/06* (2012.01)
*G06F 16/248* (2019.01)

(52) U.S. Cl.
CPC ......... *G06Q 10/087* (2013.01); *G06F 16/248* (2019.01); *G06Q 10/06315* (2013.01)

(58) Field of Classification Search
None
See application file for complete search history.

(56) References Cited

U.S. PATENT DOCUMENTS

| | | | |
|---|---|---|---|
| 7,672,862 B1 | 3/2010 | Venkatasubramanyan et al. | |
| 7,788,119 B2* | 8/2010 | Najmi | G06Q 10/06 705/7.22 |
| 8,429,035 B1* | 4/2013 | Kamath | G06Q 10/0633 705/28 |
| 8,620,729 B2 | 12/2013 | Srinivasa et al. | |
| 8,838,578 B2 | 9/2014 | Yoon et al. | |
| 2012/0130726 A1* | 5/2012 | Subramanian | G06F 17/11 705/1.1 |

OTHER PUBLICATIONS

A Linear Programming Formulation for an Inventory Management Decision Problem with a Service Constraint; Janssens et al.; 2011 (Year: 2011).*
Production and inventory management under multiple resource constraints; Bretthauer et el.; Jun. 2006 (Year: 2006).*
Torabi S.A. & Hassini E., An interactive possibilistic programming approach for multiple objective supply chain master planning, Fuzzy Sets and System 159 (2008) 193-214.
Ehap H. Sabri and Benita M. Beamon, A multi-objective approach to simultaneous strategic and operational planning in supply chain design, Omega 28 (2000) 581-598.

(Continued)

*Primary Examiner* — Deirdre D Hatcher
(74) *Attorney, Agent, or Firm* — Spencer Fane LLP; Steven J. Laureanti

(57) ABSTRACT

A system and method are disclosed for solving a hierarchy of objective functions using one or more hierarchical optimizations using explanation data stored in a database according to the one or more hierarchical optimizations, retrieving the explanation data, generating a response to a query for a goal violation by parsing the retrieved explanation data, and displaying the response.

9 Claims, 8 Drawing Sheets

(56) References Cited

OTHER PUBLICATIONS

J. Mula, R. Poler, J.P. Garcia-Sabater and F.C.Lario, Models for production planning under uncertainty: A review, International journal of production economics 103 (2006) 271-285.
Young-Jou Lai, Hierarchical Optimization: A satisfactory solution, Fuzzy Sets and Systems 77 (1996) 321-335.

* cited by examiner

SYSTEM AND METHOD OF ROOT CAUSE ANALYSIS OF OBJECTIVE VIOLATIONS AND QUERY ANALYSIS

CROSS-REFERENCE TO RELATED APPLICATIONS

This application is a continuation-in-part of U.S. patent application Ser. No. 14/738,546, filed on Jun. 12, 2015, entitled "System and Method of Root Cause Analysis of Objective Violations," which claims the benefit under 35 U.S.C. § 119(e) to U.S. Provisional Application No. 62/174,577, filed Jun. 12, 2015, and entitled "System and Method of Root Cause Analysis of Objective Violations and Query Analysis." U.S. patent application Ser. No. 14/738,546 and U.S. Provisional Application No. 62/174,577 are assigned to the assignee of the present application. The subject matter disclosed in U.S. patent application Ser. No. 14/738,546 and U.S. Provisional Application No. 62/174,577 is hereby incorporated by reference into the present disclosure as if fully set forth herein.

TECHNICAL FIELD

The disclosure relates generally to a system and method of supply chain master planning, and, more particularly, to a system and method of root cause query and analysis for goal violations of supply chain network plans derived from multi-objective hierarchical linear optimization.

BACKGROUND

Supply chain master planning broadly involves determining and evaluating decisions on the allocation of material and capacity within a supply chain network to meet consumer demand. A typical supply chain plan includes the acquisition of raw materials, the conversion of these into finished goods, and the distribution of the finished goods to downstream supply chain entities, such as warehouses and buyers. However, a supply chain faces various constraints such as production capacity, supply, and lead-time for resources and entities along with business objectives, which may be hierarchical in nature. Similarly, supply chain problems nearly always contain multiple conflicting objectives. Such plans comprise tradeoffs between constraints and objectives that often lead to goal violations.

One method commonly used to generate a plan solution based on a supply chain problem with conflicting objectives is to represent the plan as a single objective function with penalty weights assigned to multiple component objective functions. This solution is not ideal and is not an accurate representation of the plan problem because it relies on the comparison of non-equivalent vectors. Additionally, the assigned penalties are artificially derived and difficult to calculate.

A second approach is to categorize the relative importance of objectives based on business needs and solve the hierarchy of objective functions using hierarchical optimization. However, due to the hierarchical nature of the problem, the ultimate solution is far removed from the root cause of any goal violation and so useful root cause analysis according to traditional methods becomes impossible for complex plan problems. Therefore, previous methods of providing root cause analysis to the solution of supply chain planning problems have proven inadequate.

BRIEF DESCRIPTION OF THE DRAWINGS

The novel features believed characteristic of the invention are set forth in the appended claims. However, the invention itself, as well as a preferred mode of use, and further objectives and advantages thereof, will best be understood by reference to the following detailed description when read in conjunction with the accompanying drawings, wherein:

DETAILED DESCRIPTION

Figure 1:
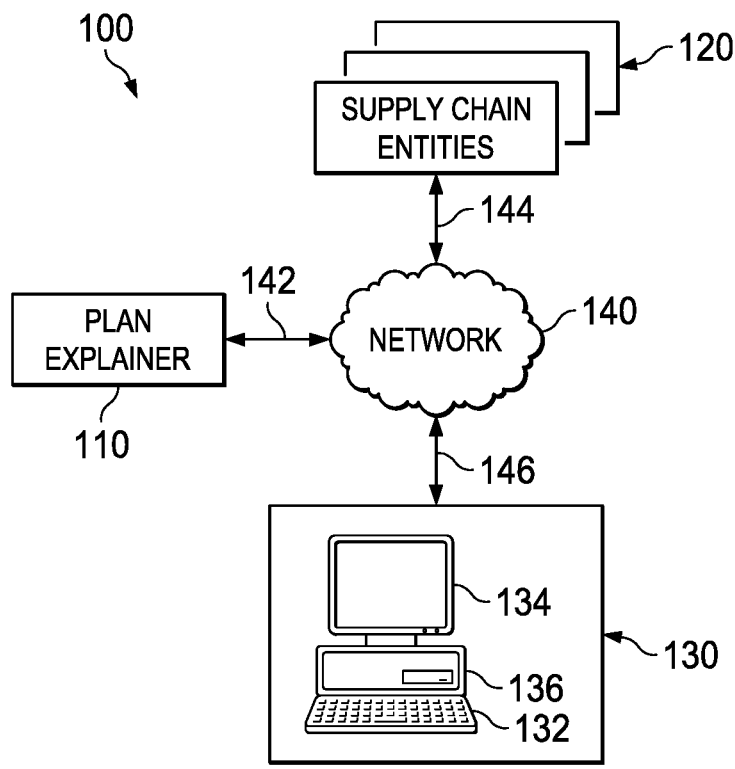
FIG. 1 illustrates an exemplary supply chain network according to a first embodiment.

Linear programming, hierarchical multi-objective optimization, heuristics for root cause analysis of objective violations, and applications presented herein are described below in the drawings and detailed description. Unless specifically noted, it is intended that the words and phrases herein be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that embodiments described herein may be practiced without these specific details. In other instances, known structures and devices are shown and/or discussed more generally in order to avoid obscuring the invention. In many cases, a description of the operation is sufficient to enable one of ordinary skill in the applicable art to implement the various forms of the invention. It should be appreciated that there are many different and alternative configurations, devices and technologies to which the disclosed inventions may be applied. The full scope of the present disclosure is not limited to the examples described below.

FIG. 1 illustrates an exemplary supply chain network 100 according to a first embodiment. Supply chain network 100 comprises plan explainer 110, one or more supply chain entities 120, computers 130, a network 140, and communication links 142, 144, and 146. Although a single plan explainer 110, one or more supply chain entities 120, a single computer 130, and a single network 140, are shown and described; embodiments contemplate any number of plan explainers 110, any number of supply chain entities 120, any number of computers 130, or any number of networks 140, according to particular needs.

In a first embodiment, supply chain network 100 exploits the efficiency of multi-objective hierarchical linear optimization to provide root cause explanations of objective violations for large-scale supply chain master planning problems of supply chain network 100. In addition, as described below in more detail, plan explainer 110 receives interactive plan queries from one or more users, parses a multi-objective hierarchical linear optimization, applies heuristics to analyze logged data, provides interactive analysis of exceptions and goal violations to determine a root cause explanation, and translates the analysis.

In one embodiment, plan explainer 110 considers various decision variables, business constraints, bounds, coefficients, changes, order of operations, goals and objectives of one or more supply chain entities 120 when determining a root cause explanation. As described below in more detail, these various decision variables, business constraints, bounds, coefficients, changes, order of operations, goals and objectives may prevent one or more supply chain entities 120 from satisfying demand, and may delay demand from being satisfied during a particular planning horizon. In addition, or as an alternative, the business constraints, goals and objectives of one or more supply chain entities 120 may include, but are not limited to, meeting various types of demand, adhering to product mix or safety stock limits, minimizing inventory, maintaining specific material or capacity, utilizing particular resources, maintaining proportional sourcing, reducing use of alternate materials, and optimizing profit. According to some embodiments, the plan explainer runs in parallel during an LP solve to gather relevant information in a log, parses interactive plan queries, and generates a root cause report on pre-defined or commonly encountered supply chain problems, such as, for example, why a demand is late, why a demand is shorted, if a data problem has occurred, if the network is broken, and the like.

Supply chain network 100 may operate on one or more computers 130 that are integral to or separate from the hardware and/or software that support plan explainer 110 and one or more supply chain entities 120. Computers 130 may include any suitable input device 132, such as a keypad, mouse, tablet, mobile, touch screen, microphone, or other device to input information. An output device 134 may convey information associated with the operation of supply chain network 100, including digital or analog data, visual information, or audio information. Computers 130 may include fixed or removable non-transitory computer-readable storage media, such as magnetic computer disks, CD-ROM, or other suitable non-transitory computer-readable storage media to receive output from and provide input to supply chain network 100. Computers 130 may include one or more processors 136 and associated memory to execute instructions and manipulate information according to the operation of supply chain network 100.

Although a single computer 130 is shown and described in FIG. 1, plan explainer 110 and one or more supply chain entities 120 may each operate on separate computers 130 or may operate on one or more shared computers 130. Each of the one or more computers 130 may be a work station, personal computer (PC), network computer, tablets, notebook computer, personal digital assistant (PDA), cell phone, smartphone, telephone, wireless data port, or any other suitable computing device. In an embodiment, one or more users may be associated with plan explainer 110. These one or more users may include, for example, a "manager" or a "planner" handling parsing of multi-objective hierarchical linear optimization, applying heuristics to analyze logged data, providing analysis of exceptions and goal violations to determine a root cause explanation, translating the analysis, and/or one or more related tasks within supply chain network 100. In addition, or as an alternative, these one or more users within supply chain network 100 may include, for example, one or more computers 130 programmed to autonomously handle, among other things, parsing data, analyzing exceptions and violations, and adjusting of various levels of safety stock and inventory and/or one or more related tasks within supply chain network 100.

In one embodiment, one or more supply chain entities 120 represent one or more supply chain networks, such as, for example, suppliers, manufacturers, distribution centers, retailers, and/or customers. A supplier may be any suitable entity that offers to sell or otherwise provides one or more items (i.e., materials, components, or products) to one or more manufacturers. In addition, or as an alternative, each of the one or more items may be represented in supply chain network 100 by an identifier, including, for example, Stock-Keeping Unit (SKU) or Universal Product Code (UPC) information.

A manufacturer may be any suitable entity that manufactures at least one product. A manufacturer may use one or more items during the manufacturing process to produce any manufactured, fabricated, assembled, or otherwise processed item, material, component, good or product. In one embodiment, a product represents an item ready to be supplied to, for example, another supply chain entity in supply chain network 100, such as a supplier, an item that needs further processing, or any other item. A manufacturer may, for example, produce and sell a product to a supplier, another manufacturer, a distribution center, retailer, a customer, or any other suitable person or entity. A distribution center may be any suitable entity that offers to store or otherwise distributes at least one product to one or more retailers and/or customers. A retailer may be any suitable entity that obtains one or more products to sell to one or more customers.

Although one or more supply chain entities 120 is shown and described as separate and distinct entities, the same entity may simultaneously act as any one of the one or more supply chain entities 120. For example, one or more supply chain entities 120 acting as a manufacturer can produce a product, and the same entity can act as a supplier to supply an item to itself or another supply chain entity 120. Although one example of a supply chain network is shown and described, embodiments contemplate any operational environment and/or supply chain network, without departing from the scope described herein.

In one embodiment, plan explainer 110 is coupled with network 140 using communications link 142, which may be any wireline, wireless, or other link suitable to support data communications between plan explainer 110 and network 140 during operation of supply chain network 100. One or more supply chain entities 120 are coupled with network 140 using communications link 144, which may be any wireline, wireless, or other link suitable to support data communications between one or more supply chain entities 120 and network 140 during operation of supply chain network 100. Computers 130 are coupled with network 140 using communications link 146, which may be any wireline, wireless, or other link suitable to support data communications between computers 130 and network 140 during operation of supply chain network 100.

Although communication links 142, 144, and 146 are shown as generally coupling plan explainer 110, one or more supply chain entities 120, and computers 130 to network 140, plan explainer 110, one or more supply chain entities 120, and computers 130 may communicate directly with plan explainer 110, one or more supply chain entities 120, and computers 130, according to particular needs.

In another embodiment, network 140 includes the Internet and any appropriate local area networks (LANs), metropolitan area networks (MANS), or wide area networks (WANs) coupling plan explainer 110, one or more supply chain entities 120, and computers 130. For example, data may be maintained by plan explainer 110 at one or more locations external to plan explainer 110 and one or more supply chain entities 120 and made available to one or more associated users of one or more supply chain entities 120 using network 140 or in any other appropriate manner. Those skilled in the art will recognize that the complete structure and operation of communication network 140 and other components within supply chain network 100 are not depicted or described. Embodiments may be employed in conjunction with known communications networks and other components.

In accordance with the principles of embodiments described herein, plan explainer 110 parses a multi-objective hierarchical linear optimization, applies heuristics to analyze logged data and provides interactive analysis of exceptions and goal or objective violations to determine a root cause explanation. Plan explainer 110 further generates root cause explanations of multiple business objectives solved hierarchically in one or more supply master planning problems of supply chain network 100. Furthermore, plan explainer 110 adjusts the product mix ratios, inventory levels at various stocking points, and proportional or alternative sourcing of one or more supply chain entities 120 based on various supply chain exceptions, constraints, rules, goals and/or objective violations.

Figure 2:
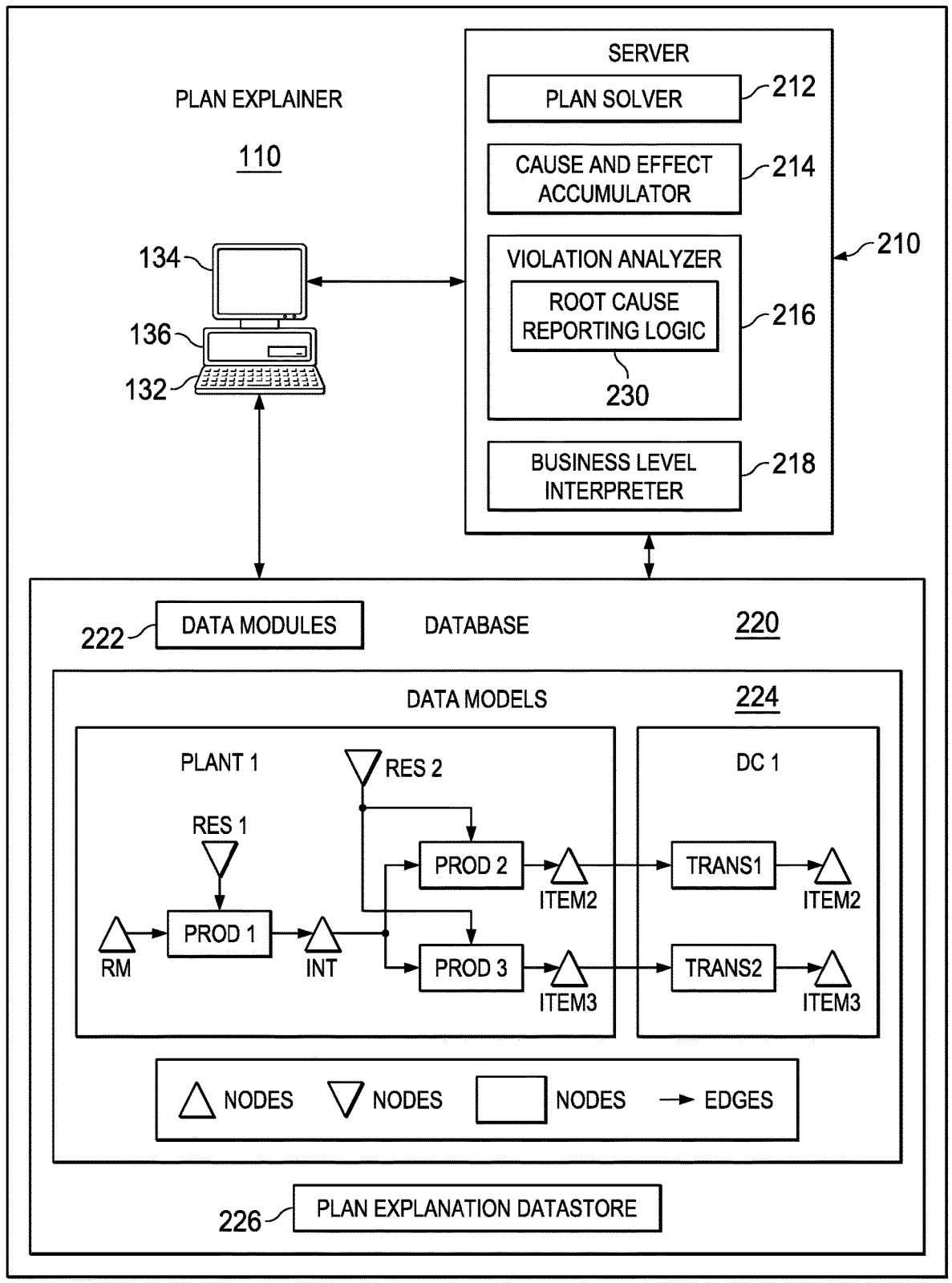
FIG. 2 illustrates the plan explainer of FIG. 1 in greater detail in accordance with the first embodiment.

FIG. 2 illustrates plan explainer 110 of FIG. 1 in greater detail in accordance with the first embodiment. As discussed above, plan explainer 110 comprises one or more computers at one or more locations including associated input devices, output devices, non-transitory computer-readable storage media, processors, memory, or other components for receiving, processing, storing, and communicating information according to the operation of supply chain network 100. In an embodiment, plan explainer 110 stores and retrieves supply chain master planning problem data, such as, for example, Linear Programming (LP) optimized plans of supply chain network 100, in database 220. As discussed in more detail below, server 210, which may operate on one or more computers, comprises plan solver 212, cause and effect accumulator 214, violation analyzer 216, and business level interpreter 218. In addition, although server 210 is shown and described as comprising a single plan solver 212, cause and effect accumulator 214, violation analyzer 216, and business level interpreter 218; embodiments contemplate any suitable number or combination of plan solvers, cause and effect accumulators, violation analyzers, and business level interpreters according to particular needs.

Database 220 comprises one or more databases or other data storage arrangements at one or more locations, local to, or remote from, server 210. Database 220 includes, for example, one or more data modules 222, one or more data models 224, and plan explanation datastore 226. As an example only and not by way of limitation, database 220 stores supply chain data, including one or more supply chain master planning problems of supply chain network 100 that may be used by server 210, and in particular, by plan solver 212. Data stored in one or more data modules 222 may be, for example, various decision variables, business constraints, goals and objectives of one or more supply chain entities 120.

As discussed in more detail below, plan explainer 110 models one or more supply chain master planning problems of supply chain network 100. That is, plan solver 212 of server 210 represents one or more supply chain entities 120 related to one or more supply chain master planning problems, in terms of a network of nodes and edges. In addition, or as an alternative, plan explainer 110 models the one or more supply chain master planning problems of one or more supply chain entities 120 to represent the flow of materials through supply chain network 100. In addition, supply chain network 100, including the one or more supply chain master planning problems is valid for a particular period of interest, i.e., a planning horizon. As discussed herein, plan explainer 110 generates a root cause analysis of objective violations for one or more supply chain master planning problems of supply chain network 100.

According to an embodiment, cause and effect accumulator 214 of server 210 processes, records, and stores in plan explanation datastore 226 variables, constraints, bounds, coefficients, changes, order of operations, and the like during hierarchical optimization. For example, during hierarchical optimization large numbers (e.g. millions) of variables are processed, some are set at bounds, singletons and doubletons are replaced by other variables. According to an embodiment, cause and effect accumulator 214 processes, records, and stores in plan explanation datastore 226 variables, constraints, bounds, coefficients, changes, order of operations, and the like during this process and intelligently gathers and establishes the relationship of those to be used during plan explanation.

Violation analyzer 216 of server 210 analyzes data stored in plan explanation datastore 226 and determines the root cause of plan exceptions. According to an embodiment, violation analyzer 216 responds to a user query or a standard batch query using root cause reporting logic 230. Root cause reporting logic 230 analyzes the data stored in plan explanation datastore 226 and generates a user queried multi objective violation root cause, which comprises, for example, why a goal violation occurred. According to another embodiment, root cause reporting logic 230 analyzes the data stored in plan explanation datastore 226 and generates a summarized multi-objective violation report which comprises the goal violations that occurred, such as, for example, demand shorted, demand lated, and/or material or resource shortage. According to an embodiment, violation analyzer 216 crawls through the data stored in plan explanation datastore 226 and determines, for one or more variables and/or objective levels, the identity of the variable and/or objective level, when the variable was fixed and/or modified during the planning solve, which variables and/or objective levels were instrumental in the fixing and/or modification of the variable, and other processes and causes as explained in this disclosure.

Business level interpreter 218 of server 210 collates and translates the reports or analysis provided by the goal violation analyzer into a user-friendly interpretation, such as a plain language (e.g. English, Spanish, German, Chinese, etc.) report or statement, which is preferably readily understood by a user of plan explainer 110. According to an embodiment, business level interpreter 218 comprises deciphering logic that analyzes variables and objective functions stored in plan explanation database 226 or output by violation analyzer 216 and provides an output in response to a submitted query. According to some embodiments, the translation provided by the business level interpreter is in the form of machine-readable output such that the translation is substantially machine actionable upon output by business level interpreter.

To further illustrate the operation of plan explainer 110 and one or more data models 224 an example is now given. In the following example, data model 224 represents one or more supply chain entities 120 related to one or more supply chain master planning problems, in terms of a network of nodes and edges and the flow of materials through a supply chain entity 120. An item is represented as a node (triangle), where a first production process (Prod 1) transforms the raw material (RM) into an intermediate good (IM), having a first resource (RES 1). The second production process (Prod 2) transforms the intermediate good (IM) into item 2 (finished good) or the third production process (Prod 3) transforms the intermediate good (IM) into item 3 (finished good) both having a second resource (RES 2). In addition, or as an alternative, item 2 and/or item 3 are manufactured at Plant 1 and are moved through a transportation operation to Distribution Center 1 (DC 1). Although, a simplified exemplary supply chain network is shown and described having a single location; embodiments contemplate any number of items, raw materials, resources, assembly operations, finished goods, nodes, and edges, according to particular needs.

As another example, data model 224 represents another one or more supply chain entities 120 related to one or more supply chain master planning problems, in terms of a network of nodes and edges and the flow of materials through a supply chain entity 120. In this example, the supply chain entity represented by data model 224 is more complex than the supply chain entity represented by data model 224, discussed above. For example, there may be multiple manufacturing plants across multiple locations, having particular lead times to move the items, transportation times, production times and cycle times. In addition, an item may be represented as a node (triangle), where a first production process transforms the raw material into an intermediate good A, intermediate good B, or intermediate good C; and multiple resources and multiple stages of production processes transform the intermediate goods into either item 1, item 2, item 3 or item 4.

Although one or more data models 224 are shown and described as comprising particular supply chain representations and configurations, including nodes and edges; embodiments contemplate any suitable supply chain representation, configuration or any combination of nodes and edges. As an example only and not by way of limitation, the number of stages in supply chain entity 120 are likely to be in the range of 10-20 stages, including multiple locations, items in the range of 500,000, business constraints in the range of 20-30, and the number of demands in the order of millions. In addition and as discussed in more detail below, one or more data models 224 may include one or more business constraints, operation constraints and resource constraints.

Plan explanation datastore 226 of database 220 stores logged data generated during solving of supply chain plan as discussed in more detail below. For example, plan explanation datastore 226 may store data generated by plan solver 212 and cause and effect accumulator 214 and provide data to violation analyzer 216 and business level interpreter 218 as explained in more detail below.

Figure 3:
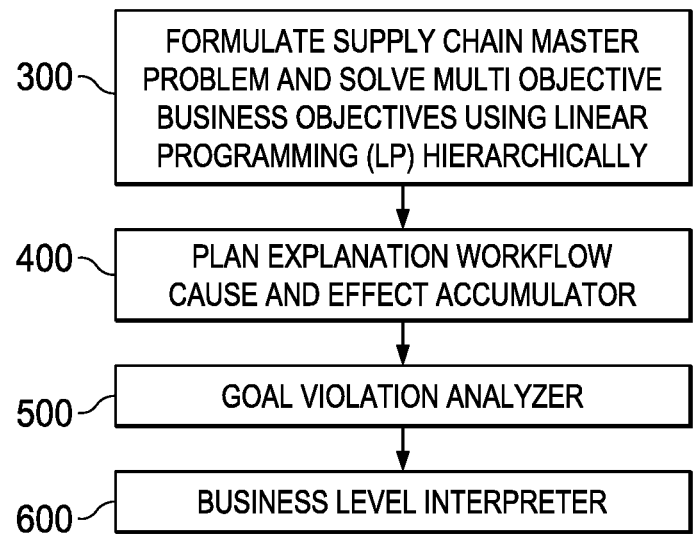
FIG. 3 illustrates an exemplary method of an overall process of plan explanation.

FIG. 3 illustrates an exemplary method of an overall process of the various components of plan explainer 110. In one embodiment, plan solver 212 of plan explainer 110 provides for formulating supply chain master problems and solving a hierarchy of multi-objective business objectives using linear programming (LP) at activity 300. According to an embodiment, cause and effect accumulator 214 performs a plan explanation workflow and stores cause and effect audit trail at activity 400. Violation analyzer 215 performs goal violations analysis at activity 500. Business level interpreter 218 performs business level interpretation at activity 600.

As discussed above, with respect to data models 224, plan explainer 110 models a supply chain scenario of supply chain network 100 as a network of nodes and edges. The material storage and/or transition units are modeled as nodes, which may be referred to as, for example, buffer nodes, buffers or nodes. Various transportation or manufacturing processes are modeled as edges connecting the nodes. The planning horizon is broken down into elementary time-units, such as, for example, time-buckets, or, simply, buckets. The edge between two buffer nodes denote processing of material and the edge between different buckets for the same buffer indicates inventory carried forward. Flow-balance constraints for most, if not every buffer in every bucket, model the material movement in the entire supply chain network 100.

As an example only and not by way of limitation, an exemplary supply chain network may have particular relationships between items and processes including nodes and edges. In this example, the exemplary supply chain network may include three items and two intermediate processes. As discussed above, one or more supply chain entities 120 represent one or more supply chain networks. Although, an exemplary supply chain network is described as including a particular number of items and processes; embodiments contemplate any number of items or processes associated with any supply chain entity, according to particular needs.

In addition and as discussed above, a planning horizon may be broken down into any number of time-units, in this example, the planning time-line is broken down into a number of discrete time-buckets, i.e., seven sequential time buckets. The storage at the start of these buckets is represented by three nodes, which correspond to material storage and/or transition units of the three items. The transformation of the first item to the second item and the second item to the third item is represented by a set of edges connecting these nodes. In one embodiment, these edges are characterized as a first process (between the first and second nodes) and a second process (between the second and third nodes). The lead times of the transformation processes are represented by the differences between the start-bucket and end-bucket of the edges. Thus, if each of the seven time-buckets represent one day, the first process may take one day, while the second process may take three days.

It should be noted that the item and process described herein is a simplified description for the purpose of illustration. For example, the items may be different sizes, styles, states of same or different physical material typically used in supply chain network 100. Similarly, a process may be any manufacturing, distribution, transportation or any other operation typically used in supply chain network 100. In one embodiment, additional constraints may be added to facilitate other planning rules. The business objectives are prioritized and modeled as hierarchy of objective functions. This model is a linear programming (LP) problem which does not consider discrete variables or constraints. For the sake of simplicity, and without loss of generality, all the objective functions are assumed to be minimized. If any objective function is to be maximized, the objective is negated and minimized for same effect.

In addition, although FIG. 3 illustrates one embodiment of a method of representing a supply chain scenario of one or more supply chain entities 120 as a network of nodes and edges and formulating supply chain master problems and solving a hierarchy of multi-objective business objectives goals using linear programming (LP), various changes may be made to the method without departing from the scope of embodiments described herein.

Figure 4:
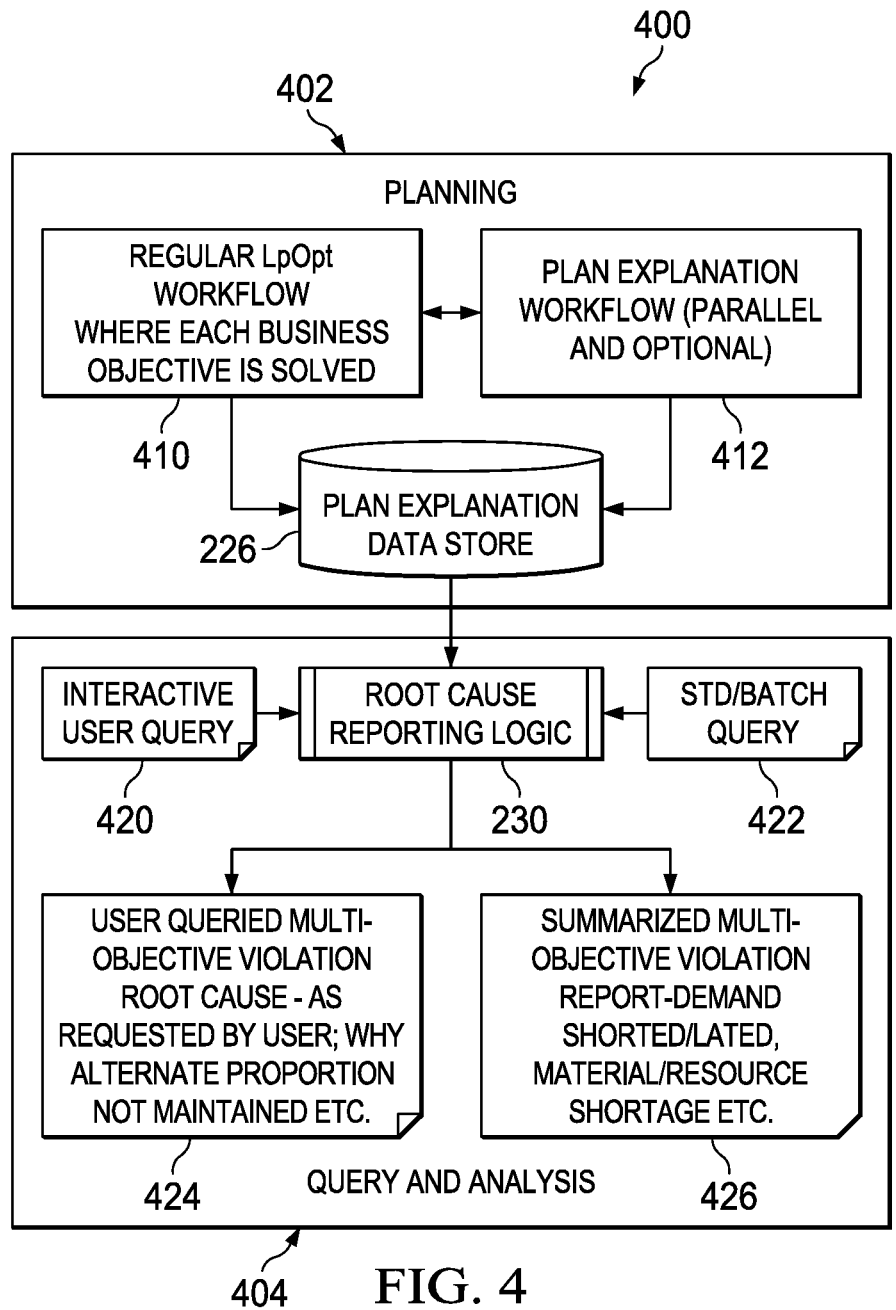
FIG. 4 illustrates an exemplary planning and plan explanation method.

FIG. 4 illustrates a planning and plan explanation method 400 according to a particular embodiment. The planning and plan explanation method 400 may comprise two stages: a planning stage 402 and a query and analysis stage 404. During the planning stage 402, plan explainer 110 performs a linear programming optimized solution method 410 that solves each business objective in a linear programming problem. Results of the linear programming optimized solution method 410 are stored in the plan explanation datastore 226. Parallel with the linear programming optimized solution method 410 is the plan explanation method 412 that stores and analyzes the process and results of the linear programming optimized solution method 410 and stores further data in the plan explanation datastore 226. The parallel processing of the linear programming optimized solution method 410 and the plan explanation method 412 will be discussed below in connection with FIGS. 5-6.

During the query and analysis stage 404, plan explainer 110 utilizes a root cause reporting logic 230 to receive an interactive user query 420 and/or standard or batch query 422. The root cause reporting logic 420 processes the one or more queries 420-422 with the data stored in the plan explanation database 226 to generate a user-queried multi-objective violation root cause 424 and/or a summarized multi-objective violation report 426. The query and analysis stage 404 will be discussed in more detail in connection with FIGS. 7-8.

Figure 5:
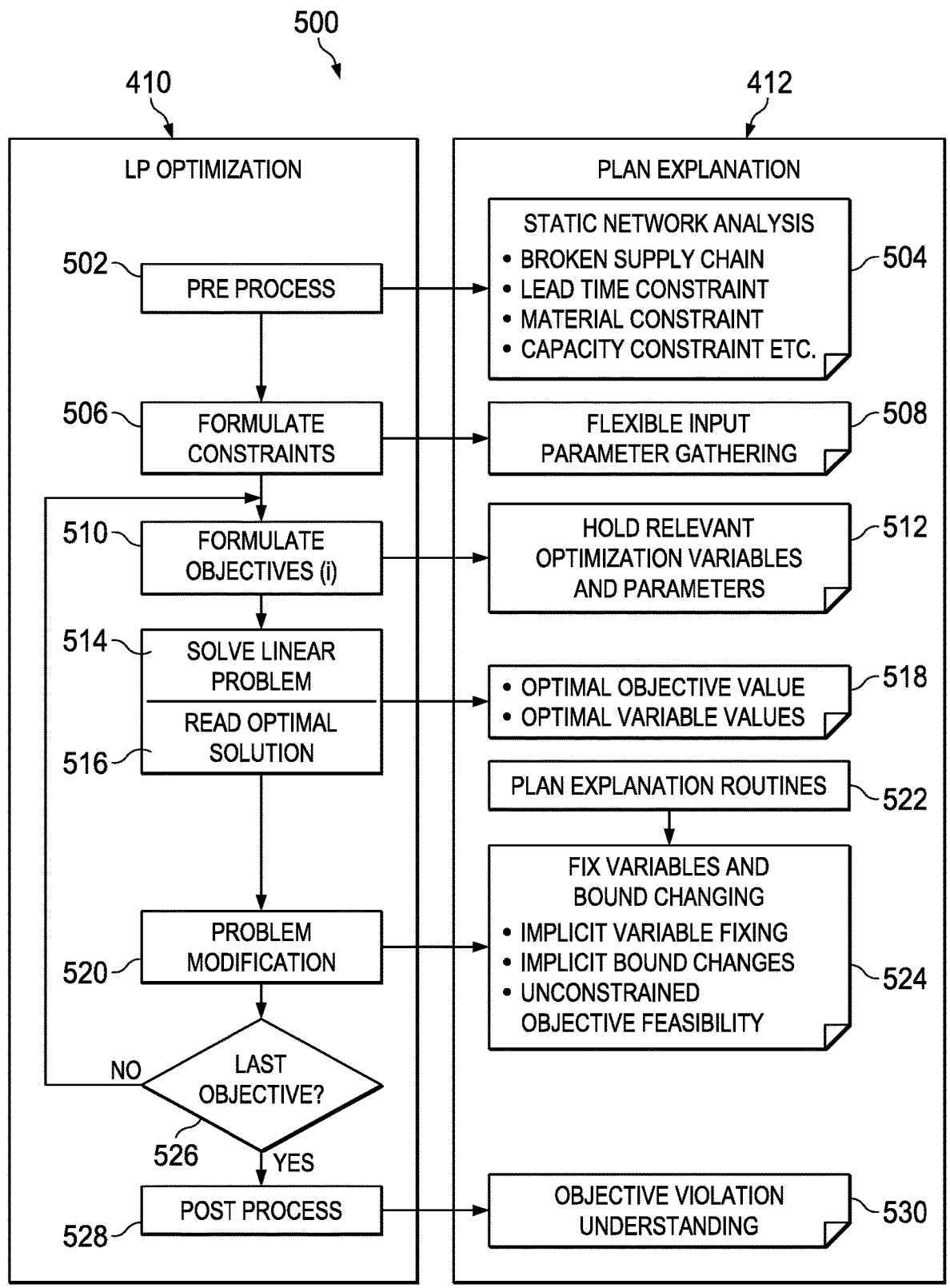
FIG. 5 illustrates an exemplary method of processing a multi-objective hierarchical linear optimization.

FIG. 5 illustrates an exemplary optimization and explanation method 500 of processing a multiple-objective hierarchical linear optimization according to an embodiment. The method 500 of a multi-objective hierarchical linear planning problem proceeds by one or more activities, which although described in a particular order may be performed in one or more permutations, according to particular needs. The method 500 may comprise two sub-methods 410-412 that may be performed simultaneously or substantially simultaneously. The first half, linear programming optimized solution method 410 optimizes and solves a multi-objective hierarchical planning problem using plan solver 212. The second half, plan explanation method 412 is performed using cause and effect accumulator 214, which analyzes, records, and stores in plan explanation datastore 226 various variables, constraints, bounds, coefficients, changes, order of operations, and the like as they are performed or changed according to the linear programming optimized solution method 410.

The method begins at activity 502, where plan solver 212 performs pre-processing of the hierarchical linear programming problem. At activity 504, cause and effect accumulator 214 performs and records static network analysis, which comprises analyzing, fixing, or solving broken supply chain, determining lead-time constraints, determining material constraints, and determining capacity constraints. At activity 506, plan solver 212 formulates constraints. At activity 508, flexible input parameters are gathered by cause and effect accumulator 214 and stored in plan explanation datastore 226. At activity 510, plan solver 212 formulates one or more objectives (i). At activity 512, cause and effect accumulator 214, holds relevant optimization variables and parameters and records the held variables and parameters in plan explanation datastore 226. At activity 514, plan solver 212 solves the linear problem. According to some embodiments, plan solver 212 solves the linear problem using a mathematical optimization tool. At activity 516, plan solver 212 reads the solution of the optimized supply chain planning Linear Problem.

At activity 518, cause and effect accumulator 214 solves and records one or more optimal objective values and one or more optimal variable values. At activity 520, plan solver 212 performs problem modification such as modifying the problem suitably to ensure that a solved oblevel is not affected by further processing and oblevel solves. At activity 522, cause and effect accumulator 214 initiates plan explanation routines. At activity 524, cause and effect accumulator 214 performs variable fixing and bound changing and tests unconstrained objective feasibility. Also at activity 524, cause and effect accumulator 214 records the results in plan explanation datastores 226. At activity 526, plan solver determines whether the last objective of the supply chain planning problem has been processed. If not, the linear program optimized solution method 410 returns to activity 510. If the last objective has been processed, linear program optimized solution method 410 continues to activity 528. At activity 528, plan solver 212 performs post processing on the supply chain planning problem and any solutions generated. At activity 530, cause and effect accumulator 214 performs objective violation understanding and stores the results in plan explanation datastore 226.

Figure 6:
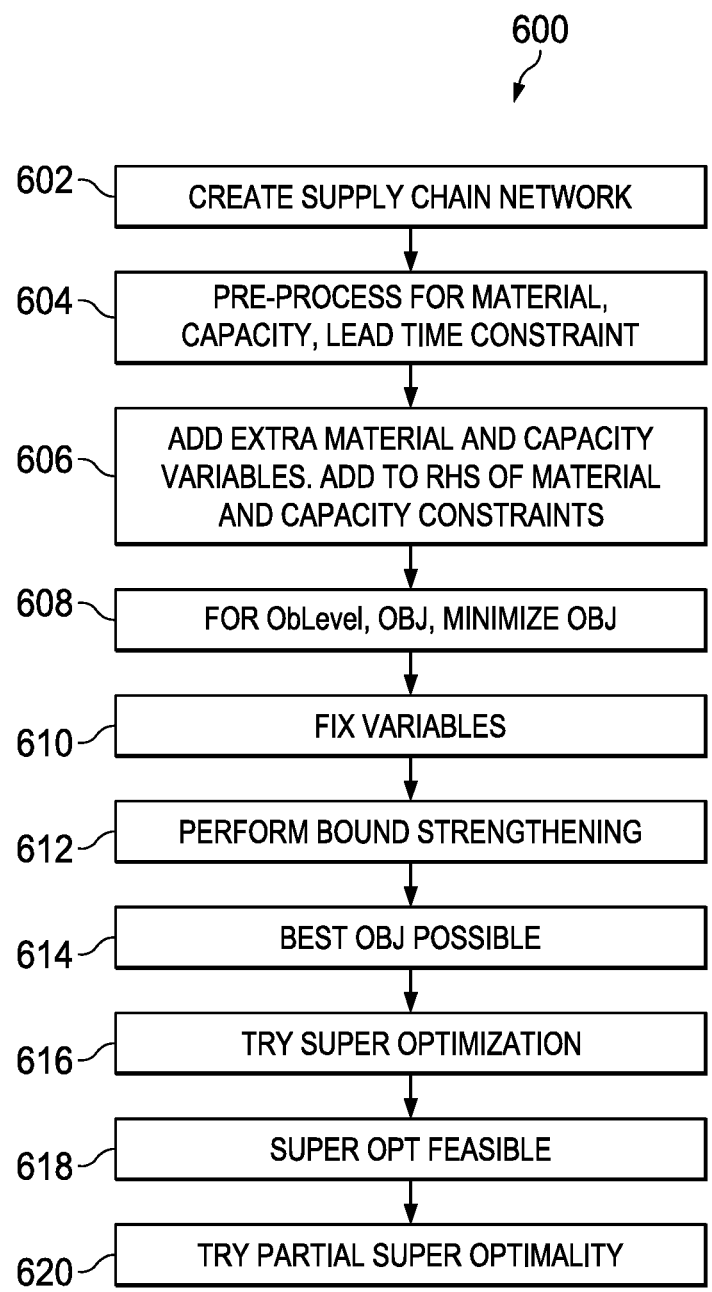
FIG. 6 illustrates an exemplary method of optimization and explanation method, according to an embodiment.

FIG. 6 illustrates an exemplary optimization and explanation method 600 according to an embodiment. Method 600 may begin with each objective represented as a linear objective function in the presentation of multiple business constraints which is then optimized. Between one objective function to the other objective function, the problem may be changed to maintain the hierarchy of the business objectives, such that the objective value of higher objectives is not degraded by lower level solves.

According to the exemplary optimization and explanation method 600, when plan explainer 110 performs an action 602-620, the cause and effect accumulator 214 also records or logs additional information according to the action 602-620, as explained in more detail below. Among other things, method 600 substantially speeds up generating a root cause analysis and/or a violation report by storing data during a linear program solve. Instead of rerunning the solve or performing a post-hoc analysis, plan explainer 110 stores all the necessary data during a supply chain plan solve that will be needed to analyze supply chain exceptions and generate a report for the root cause of any supply chain exceptions or solving errors. In this manner, plan explainer 110 is, among other things, a specific type of data structure designed to improve the way a computer stores and retrieves data in memory.

For example, as explained in connection with the following activities of method 600, various activities during the solve record aspects of the linear program solving to be used for plan explanation, but they are performed optionally and in parallel so that they do not affect the actual linear program optimization. For example, at step 602, as explained in more detail below, cause and effect accumulator 214 records the unfixed lower bound and unfixed upper bound. This data will be better used to identify any bound changes during the solve, which will be used for the plan explanation for any supply chain exceptions. And as the method continues, plan explainer 110 creates the supply chain planning problem and adds certain additional variables, all of which may be used solely for the plan explanation, but which do not affect the actual optimization.

Additionally, as oblevels for various objective function are processed, one after another, during the process of optimizing the network, separate inline processing is performed the capture data which will be used later for work data analysis and business analysis.

Although FIG. 6 illustrates an exemplary method 600 of optimization and explanation of a multi-objective hierarchical linear optimization, the method 600 of optimization and explanation of a multi-objective hierarchical linear optimization may proceed by one or more activities, which although described in a particular order may be performed in one or more permutations, according to particular needs.

According to some embodiments, the optimization and explanation method 600 generates a log stored in the plan explanation datastore. Prior to the method 600 several options may be set to generate a log consistent with the following examples. For example, an advanced_plan_analysis option may be set to true along with other requisite options. According to this embodiment, variables can be easily identified using names. According to some embodiments, changes will be made to work based on indices of the variables. In addition, or as an alternative, changes are made to be able to identify the variables that act as input for the plan, such as, for example, capacity and material availability. According to some embodiments, a Boolean input type has been added to the LP_Variable. For example, for material input, the value is set to 1; for capacity, it is set to 2, during its creation.

Furthermore, according to some embodiments, prior to initiating the optimization and explanation method 600, balance constraint creation has been modified to include an additional "WIP" variable on the Left Hand Side (LHS) whenever there is a positive work-in-progress (WIP) for a buffer; the Right Hand Side (RHS) is set to 0; and the value of WIP variable is set to the actual WIP value. Continuing with this embodiment, since the Lower Bound (LB) and Upper Bound (UB) of the WIP variable is the same, LP would hardfix the variable. Therefore, the HardFixed( ) method of the LP_Variable has been modified, and it would return true if unfixed_lower_bound==unfixed_upper_bound and the variable is of non-input type.

According to some embodiments, the following methods are used: CPXbasicpresolve, CPXpresolve, and CPXuncrushx. CPXbasicpresolve comprises a method for basic bound strengthening and determining implicitly fixed variables. CPXpresolve comprises a method for presolving without optimization of the problem, and determining the extreme values of some variables. CPXuncrushx comprises a method for mapping the presolved problem solution to the actual LP solution. Although CPX refers to IBM Ilog CPLEX solver calls, the solver calls may be generalized to corresponding functions of any suitable solvers of linear programs.

According to some embodiments, the Plan Explanation method generates a log stored in the plan explanation database according to the following exemplary notation. According to some embodiments, the log is generated with the prefix "PLAN_ANALYSIS_{x}_" where x is the index of the oblevel being solved. Depending upon what is being output, one or more prefixes is added to the output lines to generate the following log syntax, such as, for example:
  _VAR FIX: the variable was fixed based on reduced cost calculations
  _PRESLV_FIX: the variable was fixed by further bound strengthening
  _PRESLV_BDCHG_LB: the variable LB was tightened
  _PRESLV_BDCHG_UB: the variable UB was tightened
  _OBJ_COEF: current objective coefficient for the column
  _OBJ_FULLPRESOLVE_STATUS: best bound relaxation pre-solve status
  _OBJ_FULLPRESOLVE_CURR_LB_CHG: best bound relaxation required variable to be less than the current lower bound
  _OBJ_FULLPRESOLVE_CURR_UB_CHG: best bound relaxation required variable to be more than the current upper bound
  _OBJ_FULLPRESOLVE_ORIG_LB_CHG: best bound relaxation required variable to be less than the unfixed LB
  _OBJ_FULLPRESOLVE_ORIG_UB_CHG: best bound relaxation required variable to be more than the unfixed UB
  _OBJ_POSITIVE_BOUND_RELAX_STATUS: status of CPXpresolve for best bound of +ve obj coef variables
  _OBJ_NEGATIVE_BOUND_RELAX_STATUS: status of CPXpresolve for best bound of −ve obj coef variables
  _OBJ_BEST_BOUND: best possible +ve and −ve obj coef bounds attained in CPXpresolve After the log syntax has been created and the initial parameters and setting set for the plan explainer, the plan explainer begins method 600 at activity 602. At activity 602, the plan explainer 110 formulates the supply chain plan as a linear program with multiple objectives. At activity 602, the system records the unfixed upper bound and unfixed lower bound, [#RECORD Unfixed_UB, Unfixed_LB].

According to some embodiments, at activity 602, plan explainer models a supply chain scenario of supply chain network 100 as a network of nodes and edges and formulates supply chain master problems with multiple objectives. As an example only and as discussed above, data models 224 represents one or more supply chain entities 120 related to one or more supply chain master planning problems, in terms of a network of nodes and edges and the flow of materials through a supply chain entity 120. Plan explainer 110 then parses the one or more supply chain master planning problems of the supply chain scenario of data models 224 and captures, records, and logs data of the multi-objective hierarchical linear optimization, such as the unfixed upper and lower bounds, and stores the logged data in plan explanation datastore 226 of database 220.

At activity 604, plan explainer 110 performs pre-processing of material, capacity and lead time constraints and records any bound data in database 220, such as, for example, unfixed upper bound and lower bound data. In addition, the pre-processing indicates any data error present in the supply chain scenario of data models 224. At activity 606, plan explainer 110 adds one or more logical variables to the logged data, i.e. to the right hand side (RHS) of one or more constraint equations and records the additional data in database 220. According to some embodiments, one or more logical variables comprise extra material and capacity variables, safety stock constraints, product mix constraints, or the like. According to some embodiments, these one or more logical variables are added to the logged data, such as, for example, the RHS of material and capacity constraints and the additional data is recorded in database 220, such as, for example, capacity i and material j in bucket t.

At activity 608, plan explainer 110 captures, records and logs data for objective level, OBJ, minimize Obj. That is, for every business objective or objective level, plan explainer 110 minimizes the business objective violation and records additional data about the objective coefficients for every variable. At activity 610, plan explainer 110 fixes the variables to ensure that the highest objectives are not negated by this process and records the additional data in database 220. According to some embodiments, the plan explainer fixes the variables according to a reduced cost calculation and the variable fixed is stored in the plan explanation datastore. Based on the variable fixing action, the plan explainer makes minimal changes to the problem compared to constraint addition, and the solution of one problem is directly usable for the next problem, increasing efficiency. According to some embodiments, the hierarchy of objective functions is maintained by inspecting reduced cost and/or value after every objective optimization (minimization), and if Reduced Cost>0, value should be at LB, Fix it at LB; and if Reduced Cost<0, value should be at UB, Fix it UB.

As an example only and not by way of limitation, plan explainer fixes the variables, as shown below:

If RC<0, CurentLB=CurrentUB=Unfixed_UB, RECORD VAR_FIX

If RC >0, CurrentLB=CurrentUB=Unfixed_LB, RECORD VAR_FIX

Not all candidate variables are explicitly fixed

At activity 612, plan explainer 110 performs additional bound strengthening which determines which are the variables and which were the bounds that were changed by this objective function. According to some embodiments, the plan explainer performs bound strengthening activity by comparing the revised upper and lower bounds, and if the bounds are tightened, change the LP bounds in the problem (This change carries on to regular LP planning). Furthermore, if the lower and upper bounds are same, fix the variable, and store the output for the above two parts of this action in plan explanation datastore.

In one embodiment, plan explainer 110 performs bound strengthening, as shown below:

Change UB & LB for all variables, RECORD PRESLV_BDCHG_LB & PRESLV_BDCHG_UB

If UB==LB, fix the variable, RECORD PRESLV_FIX_

These changes go into regular LP Optimization workflow

The logged data is stored in database 220 and exemplary log data is shown below:

Error.log
-----------

ERROR017: Delivery operation 'Delop_Item_3' not created for 'Item3'

Delivery Operation 'Delop_Item_2', var AMT100001001, demand 1800, price 0

===================

1_PRESLV_BDCHG_UB: var AMT100001001 index 36 UB 1800 changed to 600
2_VAR_FIX: var AMT100001001 index 36 fixed at 600
2_VAR_FIX: var AMT100001001 index 36 fixed at 600
2_OBJ_COEF: var AMT100001001 index 36 objCoef −3 value 600
3_OBJ_COEF: var AMT100001001 index 36 objCoef 3.20000005 value 600

After the Objective level function is called, plan explainer 110 determines the best possible value of the objective function, at activity 614. For example, if demand satisfaction is being maximized, plan explainer 110 determines if all of the demand is satisfied to the best possible value and records the obj_best_bound in plan explanation datastore.

For the sake of uniformity and ease of calculation, it may be assumed that the objective function is always of minimization type. If an objective is of maximization type, the objective coefficients may be negated and the type can be converted to minimization type, without affecting the final outcome.

At activity 616, plan explainer 110 performs a super optimization that generates modifications in terms of the objective coefficients and also in terms of the bounds, and monitors any changes in the problem of the previous objectives. That is, plan explainer 110 determines if the problem is feasible, and if so, then super optimality is achieved. According to some embodiments, plan explainer performs a super optimization activity by fixing the variable to its unfixed upper bound if the obj_coef<0, fixing the variable to its unfixed lower bound, if the obj_coef>0, and if the obj_coef==0, then fixing the lower bound to 0 and the upper bound to infinity, when the variable is an input type, and fixing the lower bound as the unfixed lower bound and the upper bound as the unfixed upper bound, when the variable is a non-input type variable.

According to some embodiments, plan explainer determines if the problem is feasible, and if so, then super optimality is determined, as shown below:

Check Feasibility of Relaxed Problem, separate from regular LP Flow:
  1) For Every Obj Variable, change bounds
    1.1) if ObjCoef <0 Set to Unfixed_UB
    1.2) if ObjCoef >0 Set to Unfixed_LB
    1.3) if ObjCoef==0
      1.3.1)Var is Mat or Cap,
        1.3.1.1) Set LB=0
        1.3.1.2) Set UB=Inf
      1.3.1.2)Otherwise
        1.3.2.1) Set LB=UnfixedLB
        1.3.2.2) Set UB=UnfixedUB
  2) Check Feasibility of the problem and record status. (Call CPXPresolve of CPLEX solver)
  OBJ_FULLPRESOLVE_STATUS At activity 618, plan explainer 110 determines if super optimality was possible, if not, plan explainer 110 determines how to super optimize the problem even if sufficient materials and capacity or sufficient flexibility is present in the input parameters. According to some embodiments, plan explainer performs the super opt feasible activity by:
  i. If the OBJ_FULLPRESOLVE_STATUS=0, it means it is possible to attain best possible ob value with relaxed inputs
    1. Use CPXuncrush to get the value of the variables from presolved problem.
    2. For the input variables, if the value is below unFixedLB or above unFixedUB, report. It means that the input types needed to be more than what was originally given in the problem.
    3. For the input variables, if the value is below currentLB or above currentUB, report. It means that if the input types were to be relaxed, some of the previous oblevels would be effected, since they would have changed the LB and the UB.

Based on this, plan explainer determines if the super optimality was possible, then records in the plan explanation datastore. If super optimality was not possible, the method continues to the try partial super optimality activity.

In one embodiment, plan explainer 110 determines if super optimality was feasible, as shown below:

Super Optimization Status==0 (super optimization possible with relaxed inputs)
  1) For every variables
    1.1) If (value<unfixedLB) OR (value>unfixedUB)
    (Means input flexing would be needed for super optimal solution)
    RECORD_OBJ_FULLPRESOLVE_ORIG_LB_CHG OR _OBJ_FULLPRESOLVE_ORIG_UB_CHG 1.2) If (unfixedLB<value<unfixedUB) AND
   1.2.1) (value <currentLB)
   (Means for super optimal solution, previous oblevels would be affected)
   RECORD_OBJ_FULLPRESOLVE_CURR_LB_CHG
   1.2.2) (value>currentUB)
   (Means for super optimal solution, previous oblevels would be affected)
   RECORD_OBJ_FULLPRESOLVE_CURR_UB_CHG For example, if super-optimization is feasible, then plan explainer 110, may analyze the actual values of, for example, the material and capacity variables, and compares those values against the original values and/or original bounds. Additionally, the plan explainer 110 may compare the material and capacity original bounds with the bounds as modified by the one or more previous objectives. During the super-optimization solve, plan explainer 110 records information regarding the status and the change in the value for the material and capacity variables which may be a flexible input.

At activity 620, plan explainer 110 performs a partial super optimality. According to some embodiments, if the status !=0, it means that it is not possible to get best possible objective value even with infinite capacity and material, which can happen only if there are conflicting variables in the oblevel, one variable is tried to be maximized while another dependent variable is tried to be minimized. An example is profit_optimization where demand satisfaction is maximized, but required operation plan is minimized. According to some embodiments, plan explainer performs a try partial super optimality activity by:

1. If status!=0 and there are +ve obj coefs, try to get best possible values for positive objcoef variables
  a. Restore the current bounds of all variables
  b. If the objCoef is +ve, fix the variable at unfixedLB
  c. For other variables,
    i. If input type, lb=0, ub=Inf
    ii. If non-input type, lb=unfixedLB, ub=unfixedUB
  d. Use CPXpresolve. Get the solve status
  e. If solveStatus=0, it means that it is possible to get best possible objective for minimization part of the oblevel
  f. If solveStatus !=0, it means that it is not possible to get best possible objective for minimization part of the oblevel
2. If status!=0 and there are -ve obj coefs, try to get best possible values for positive objcoef variables
  a. Restore the current bounds of all variables
  b. If the objCoef is -ve, fix the variable at unfixedUB
  c. For other variables,
    i. If input type, lb=0, ub=Inf
    ii. If non-input type, lb=unfixedLB, ub=unfixedUB
  d. Use CPXpresolve. Get the solve status
  e. If solveStatus=0, it means that it is possible to get best possible objective for maximization part of the oblevel
  f. If solveStatus !=0, it means that it is not possible to get best possible objective for maximization part of the oblevel If the objective value is not the best possible, best relaxation solve is also not feasible, but the +ve and the -ve part of the oblevels can be best-bounded, it means that there are dependent variables in the oblevel. One is tried to be maximized and another related variable is tried to be minimized.

By way of further explanation, an example is now given. For example, if the plan explainer is determining a solve of a linear problem for profit optimization, then plan explainer tries to maximize the profit which is the minimization of cost and maximization of revenue at the same time. In that case, plan explainer divides the linear problem into two halves, the first half is the information part and the second half is the minimization part. Next, plan explainer tries to solve each of these parts individually to understand if at least one part of the problem could be super-optimized. And based on the results of the first part, the second part, and both, the plan explainer records information, and stores the information in the plan explanation datastore 226.

When super-optimization is not successful, plan explainer 110 performs a two part super-optimal objective analysis. By way of an example, for an analysis comprising demand satisfaction, plan explainer 110 will attempt to use an objective function to maximize all variables which are demand variables. However, if the optimization is for cost, such as total profit optimization, then the optimization will have two parts: some of the variables will pertain to cot and some of the variables will pertain to revenue. In this case, the objective will be the revenue minus the cost, and therefore, some of the objectives will be positive and some of the objective coefficients will be negative. This leads to two conflicting parts of the objective: one part is maximization and one part is minimization. This would lead to two results: either zero cost and some revenue, or some cost and a maximum of revenue.

In this situation, plan explainer 110 separates the problem into two additional optimizations, the positive portion and the negative portion. In this case, if the positive part is super-optimal, then this determines that maximizing the variables (in this example, revenue) will need to be flexed. This determines that more material or capacity is needed. However, when the second optimization is solved (in this example, the cost minimization), the plan explainer 110 identifies if any variables need to be flipped. This determines, for example, that more capacity or more or less material is need. Based on these two optimizations, the plan explainer 110 generates two answers: one answer related to maximization and one related to minimization, and the plan explainer 110 may use both in determining an optimal solution for the linear program.

Figure 7:
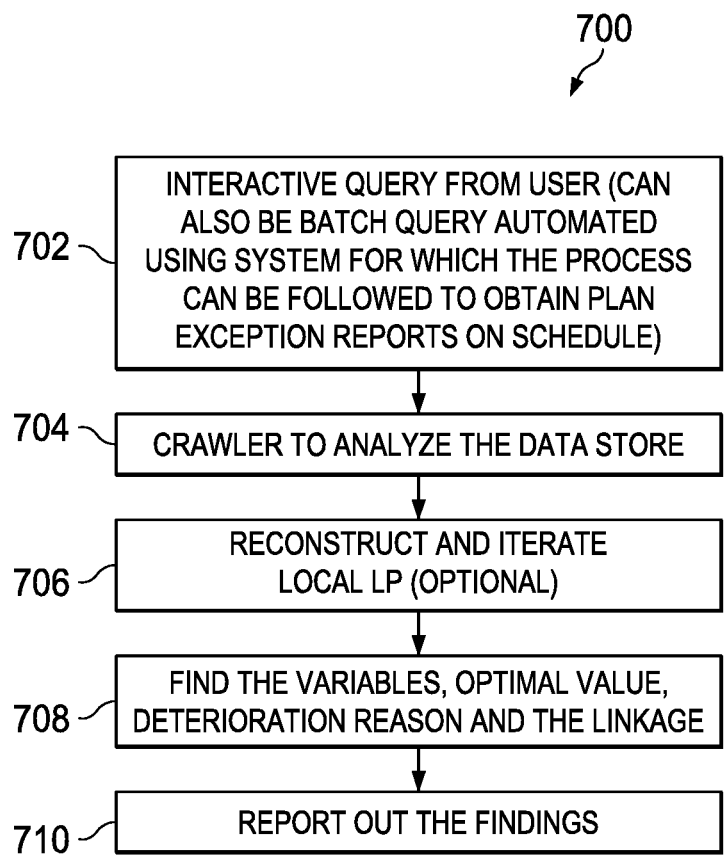
FIG. 7 illustrates an exemplary method of query and analysis, according to an embodiment.

FIG. 7 illustrates an exemplary query and analysis method 700 according to a particular embodiment. According to some embodiments, the query and analysis method 700 generates answers and reports to queries regarding the linear programing optimized plan. According to some embodiments, the query and analysis stage 404 of plan explainer 110 generates answers regarding the linear programming optimized plan to interactive user queries 420 and standard or batch queries 422. The queries may take the form of textual queries, either input by a user or selected from a menu. Such queries regarding the supply chain planning problem may comprise, for example, "Why was demand shorted?" "Why was a particular alternate chosen?" "Why is proportional sourcing not maintained?" "Why is more inventory held than required?" "Why is the product mix not adhered to?" and the like.

At activity 702, plan explainer 110 receives an interactive user query 420 from one or more users and/or a standard or batch query 422 automated by plan explainer 110 for which the process can be followed to obtain plan exception reports according to a schedule. In response to the query, plain explainer 110 analyzes and parses the query to locate the one or more variables relevant to the query. According to some embodiments, plan explainer 110 comprises a natural language process that analyzes, parses, and converts the query from a textual or graphical input into a computer-readable query that initiates the violation analyzer 216 to locate the variable or variables relevant to the query.

According to the natural language process, when plan explainer 110 receives a plain language query by a user, business level interpreter 218 parses the plain language query for particular key elements to generate a machine-readable query based on associations between the plain language and the key elements. For example, in response to a user query for "Why is the demand D1 short and late?" the business level interpreter 218 may parse this query by analyzing the textual statement and identifying "demand" "D1" "short" and "late." In response to these key elements, the business level interpreter 218 may generate a machine-readable query that identifies the variable associated with the item corresponding to item D1, and look for objective level changes that have caused the item D1 to be short and late, as explained in more detail below.

Other key components that may be parsed from a plain language query include dates, time periods, demand satisfaction, resource violation, demand lateness, sourcing violation, safety stock violation, stocking points, resources, items, or other elements of a supply chain or supply chain model, as explained herein.

According to some embodiments, plan explainer 110 may generate a query from a guided query interface. For example, business level interpreter 218 may display on a display 134 a textual or graphical representation of one or more supply chain model components, such as a resource, item, process, plant, factory, manufacturing stage, or any other component of a supply chain for selection by a user. In response to one or more selections by a user, plan explainer 110 may iteratively build a query from one or more selected components to generate a machine-readable query for initiating a query and analysis method 700. According to some embodiments, plan explainer 110 may present one or more suggested queries to the user for selection from a menu. The menu may comprise a hierarchical organization such that the user may select a first aspect of the supply chain and drill down into more specific components to identify the particular query that the user wants to run.

For example, display 134 may display a first question that asks the user to select from one or more menu items, such as analyze demand satisfaction, resource violation, demand lateness, sourcing violation, or safety stock violation. If a user selects one of these menu items, display 134 refreshes to display a more specific question related to the selected first menu item. For example, if the analyze demand satisfaction menu item was selected, display 134 may display a question that queries the user to "enter the buffer name." In response to entering the buffer name, violation analyzer 216 may initiate the process for locating any variables related to demand satisfaction for the particular buffer entered by the user. Further questions may ask, for example, what is the date of the demand, the location of the demand, and the like.

According to some embodiments, further examples of queries may comprise, for example, determining shorted or lated demand, partially meeting one demand while another demand is shorted, why all demands in a particular cluster/layer are shorted, why inventory is carried forward, why a safety stock is not respected for a particular SKU, or any other like supply chain planning problem. Other queries may comprise, for example, "Why is the demand D1 short and late?" "Why is D2 partially met whereas D3 is shorted?" "Why are all demands in a particular cluster/layer are shorted?" "Why is layer1 (a group of demands) partially satisfied and also why is layer2 fully short?" "Why is inventory carried forward?" "Why is one demand satisfied over the other?" "Why is Demand N in layer M shorted?" "Why is the entire layer M shorted?" and "Why is the min time safety stock not respected at SKU1 and SKU2?" Embodiments contemplate any other suitable queries according to particular needs.

At activity 704, violation analyzer 216 of plan explainer 110 comprises a crawler that analyzes, in response to the query, the log generated by the plan optimization and explanation method 600. As will be explained in more detail below, violation analyzer 216 loads the log file into a memory of computer 130 in preparation to parse the stored information from the plan optimization and explanation method 600.

At activity 706, the plan explainer reconstructs and iterates the linear program. At activity 708, violation analyzer 216 of plan explainer 110 finds one or more variables, optimal value, deterioration reason, and/or linkage in response to the query. For example, as explained in connection with FIG. 8, violation analyzer 216 analyzes the log generated by the plan explanation and optimization method 600 to locate the variables, optimal value, deterioration reason, and/or linkage based on the particular query presented by the user. For example, if the query entered by the user was "Why is the demand D1 short and lated?" the violation analyzer 216 locates variables related to a capacity constraint on any resources (such as R1 and R2, as explained in the particular example below) that cause the demand for D1 to be short or lated.

At activity 710, plan explainer 110 generates a report comprising a response to the query. As explained in detail above, business level interpreter 218 collates and translates the reports or analysis provided by goal violation analyzer 216 into a user-friendly interpretation, such as a plain language report or statement. Business level interpreter 218 may comprise deciphering logic that analyzes variables and objective function stored in the plan explanation database 226 or output by violation analyzer 216 and provides a user queried multi-objective violation root cause 424 or a summarized multi-objection violation report 426. The following table illustrates exemplary responses based on queries.

TABLE 1

| Dataset | Query | Response |
| --- | --- | --- |
| Dataset | Why is the demand D1 short and late | Capacity constraint on resource R1 & R2 |
| Dataset2 | Why D2 partially met whereas D3 is shorted | Inventory is specified as higher priority for the business compared to demand D2. D3 shorted due to data error |
| Dataset3 | Why all demands in a particular cluster/layer are shorted | Product mix violation which is higher priority for other sets of demands and done at resources R3 and R4 |
| Dataset4 | Why is a layer 1 (a group of demands) partially satisfied and also why is layer2 fully short | Max Safety stock violation is restricting the demand satisfaction causing shortage |
| Dataset5 | Why is inventory carried forward | Resource utilization on R5 makes it produce and carry it forward |
| Dataset6 | Why one demand satisfied over the other | Profit optimization figured out that the margin is higher for the other demand though the selling price of the first demand was higher |

TABLE 1-continued

| Dataset | Query | Response |
|---|---|---|
| Dataset7 | Why is Demand N in layer M shorted | Due to profit optimization being higher priority than this demand satisfaction objective specified by user |
| Dataset8 | Why is the entire layer M shorted | Conflicting objective function X & Y specified by user resulting in this condition |
| Dataset9 | Why min time safety stock is not respected at SKU1 and SKU2 | Profit optimization across demands causing it to hold less than the Safety stock leading to violation |

Figure 8:
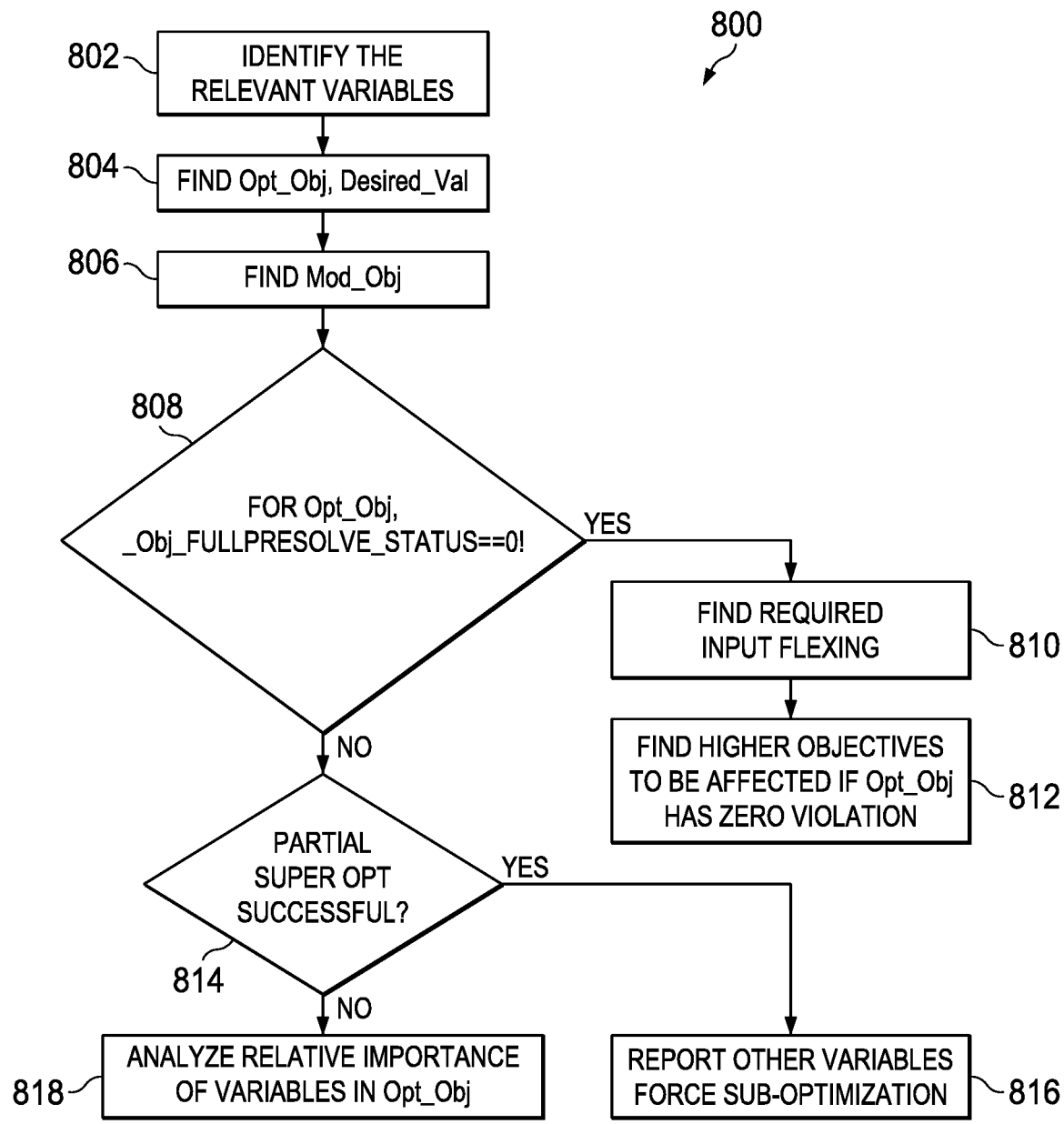
FIG. 8 illustrates an exemplary method of query and analysis, according to a further embodiment.

FIG. 8 illustrates an exemplary query and analysis method 800 according to a particular embodiment. After plan explainer 110 performs optimizations on the linear plan problem, plan explainer 110 may respond to queries based on information or data stored in plan explanation database 226 during the optimization process.

According to some embodiments, business level interpreter 218 may identify or parse queries entered into plain text into a machine-readable form such that a user may enter a query in plain language and the business level interpreter sends a machine-readable query to the violation analyzer for processing. According to some embodiments, the business level interpreter receives the results of query and analysis method 800 and translates the output into a plain language format.

At activity 802, plan explainer 110 identifies the first objective which contains the relevant variable and names it, for example, opt_obj. According to some embodiments, the plan explainer parses the question and identifies the variable that influenced the objective or variable present in the query. For example, if the query comprises a demand satisfaction, plan explainer 110 may identify a variable, AMT_VAR, which should be maximized in an objective. Additionally, if the query is regarding demand shortage, plan explainer 110 identifies relevant AMT variables are identified. If the query is regarding excess inventory, plan explainer 110 identifies an XBAL variable.

At activity 804, plan explainer 110 may identify the objective function responsible for optimizing the relevant variable. For example, after plan explainer 110 identifies the relevant variable, such as AMT_VAR, plan explainer 110 may determine which objective function was responsible for optimizing the relevant variable. According to an embodiment, plan explainer 110 identifies the objective function for optimizing the relevant variable by:
  i. If the obj_coef is −ve, identify the objective which changed the UB of the variable, name it mod_obj
  ii. If the obj_coef is +ve, identify the objective which changed the LB of the variable, name it mod_obj At activity 806, plan explainer 110 identifies the objective that modified the bound of the objective responsible for modifying the variable. According to an embodiment, plan explainer 110 identifies the objective by:
  i. If the mod_obj is higher than the opt_obj. It is understood that higher objective function required this variable to be sub-optimal. Go to relaxation_analysis step for the opt_obj.
  ii. If the mod_obj is same as opt_obj, go to relaxation_analysis step for opt_obj.

At activity 808, plan explainer 110 performs a relaxation analysis. If the OBJ_FULLPRESOLVE_STATUS=0, then query and analysis method 800 continues to activity 810, to find required input flexing. At activity 810, plan explainer 110 may determine the value over the original upper bound is extra value required for input variable, such as capacity or material. According to an embodiment, plan explainer 110 determines the value by:
  Check for _OBJ_FULLPRESOLVE_ORIG_UB_CHG for input variables. The value over the origUB is extra value required for cap/material.

At activity 812, plan explainer 110 determines higher oblevels would be affected if the present oblevel was to be met to a best possible value.
  Check for _OBJ_FULLPRESOLVE_CURR_UB_CHG and _OBJ_FULLPRESOLVE_CURR_LB_CHG for input variables. If this variable has been fixed/tightened by higher oblevels, those oblevels would be effected if this present oblevel was to be met to best possible value.

Returning to activity 808, if the if the OBJ_FULLPRESOLVE_STATUS≠0, plan explainer 110 continues to activity 814. At activity 814, plan explainer 110 determines if partial super optimization is successful when there are some conflicting variables in the oblevel. If the partial super optimization is successful, method 800 continues to activity 816. At activity 816, plan explainer 110 determines if other variables force sub-optimization by checking a bound relax status. According to an embodiment, plan explainer 110 determines if other variables force sub-optimization by:
  i. Check for _OBJ_POSITIVE_BOUND_RELAX_STATUS. If this status is 0, conclude that the minimization part of the objective function can be super-optimized
  ii. Check for _OBJ_NEGATIVE_BOUND_RELAX_STATUS. If this status is 0, conclude that the maximization part of the objective function can be super-optimized
  iii. If both the above status is zero, confirm the finding that the objective function contains conflicting variables.

Returning to activity 814, if plan explainer 110 determines that partial super optimization is not successful, method 800 continues to activity 818. At activity 818, plan explainer 110 checks for the objective coefficients of the variables and their values. If relaxation analysis does not provide any answer, plan explainer 110 identifies the objective coefficients of the variables and their values. If variables with lesser objective coefficient have more value and vice-versa, plan explainer determines that more favorable variables in the objective function were given preference. Plan explainer 110 may then generate a list of lesser objective coefficient variables.

To further explain the operation of FIG. 8 and the process of analyzing logged data of exception and goal violations of a multi-objective hierarchical linear optimization, several examples are now given.

Figure 9:
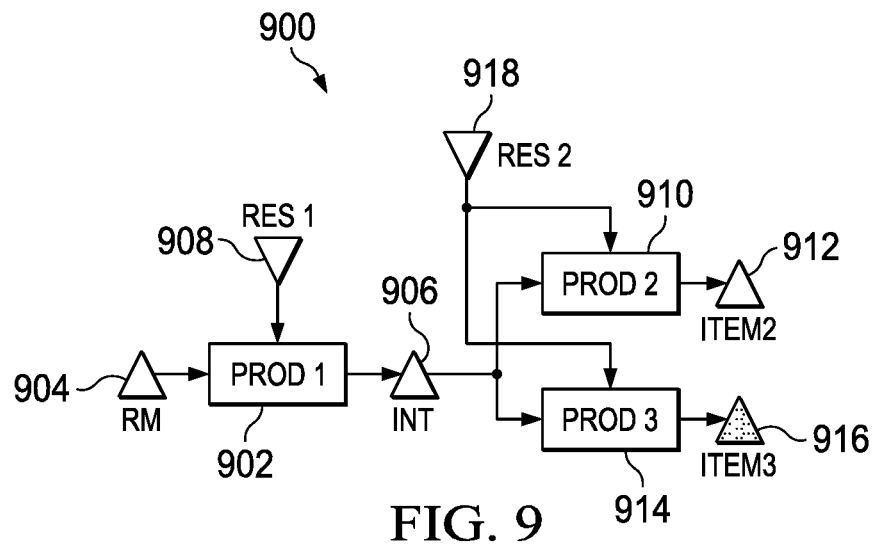
FIG. 9 illustrates an exemplary supply chain network model, according to an embodiment.

FIG. 9 illustrates a first exemplary supply chain network model 900, according to an embodiment. In the following example, and as discussed above, data models 224 represent one or more supply chain scenarios. A first supply chain network model 900 may comprise a first production process (Prod) 902 that transforms raw material (RM) 904 into an intermediate good (INT) 906, using a first resource (RES 1) 908.

The first supply chain network model 900 may further comprise a second production process (Prod 2) 910 that transforms an intermediate good (INT) 906 into a first finished good (Item2) 912 and a third production process (Prod 3) 914 that transforms the intermediate good (INT) 906 into a second finished good (Item3) 916, both production processes 910 and 914, using a second resource (RES 2) 918. In addition, a first objective level (objective function 1) of the supply chain scenario of data models 224 is that the first finished good 912 cannot be held in stock i.e., the max safety stock for the first finished good 912 is zero which means that the supply chain scenario cannot hold anything more than 0. The second objective level (objective function 2) is to try to provide the first finished good 912 for 1800 units.

Plan explainer 110 parses the error logs and, in this example, determines that "Delop_Item_3" which was supposed to be the delivery operation of the second finished good 916 was actually not created, because there was some problem in the data itself, which indicates a broken link in the supply chain scenario 900, as shown below, in the exemplary data log:

ERROR017: Delivery operation 'Delop_Item_3' not created for 'Item3'
Delivery Operation 'Delop_Item_2', var AMT100001001, demand 1800, price 0

In addition, for the second demand that was given in Layer 1, plan explainer 110 determines that this is the variable (var AMT100001001) that should have been optimized in an objective function. Plan explainer 110 then parses the logged data, for this variable (var AMT100001001) to find these lines:

1_PRESLV_BDCHG_UB: var AMT100001001 index 36 UB 1800 changed to 600
2_VAR_FIX: var AMT100001001 index 36 fixed at 600
2_VAR_FIX: var AMT100001001 index 36 fixed at 600
2_OBJ_COEF: var AMT100001001 index 36 objCoef −3 value 600
3_OBJ_COEF: var AMT100001001 index 36 objCoef 3.20000005 value 600

As shown in the exemplary logged data above, the first number represents the objective function (1, 2, 3) during which plan explainer 110 recorded this data. The second part (PRESLV_BDCHG_UB) is the type of information provided in the particular line. For example, as shown above, in objection function 1, in the pre-solve state (PRESLV), there was a bound change (BDCHG) for the upper bound (UB) for variable (var AMT100001001) and the upper bound was really 1800 (UB 1800) and was (changed to 600). In addition, objective function 2 fixed variable (var AMT100001001) by setting the upper and lower bound to the same value (600). Also, objective function 2 has a negative objective coefficient for this variable (objCoef −3 value 600):

2_OBJ_COEF: var AMT100001001 index 36 objCoef −3 value 600
3_OBJ_COEF: var AMT100001001 index 36 objCoef 3.20000005 value 600

Plan explainer 110 identifies which objective function was supposed to maximize or minimize this particular variable. Plan explainer 110 thereby identifies the Opt_Obj (objective responsible for optimizing the variable), and then determines for all the objectives before that, which would have changed the bounds on this particular variable (i.e., objective 1 constricted to 600):

1_PRESLV_BDCHG_UB: var AMT100001001 index 36 UB 1800 changed to 600

Therefore, objective function 2 is a demand satisfaction objective (2_OBJ_COEF: var AMT00000100001001 index 36 objCoef −3 value 600) and objective function 1 is the maximum safety stock objective (1_PRES_LV_BDCHG_UB: var AMT00000100001001 index 36 UB 1800 changed to 600), and based on comparison and analysis of these two, plan explainer 110 determines, in this example, that it is the maximum safety stock that is forcing the demand to be constrained at 600 units (max safety stock oblevel is forcing the amt var to be set to 600 at max), which ultimately generates a response to a query for why demand is not met for this particular plan problem.

After a root cause of a goal violation of the first objective level and the second objective level of the supply chain scenario is determined, plan explainer 110 generates an optimum inventory level and adjusts one or more supply chain entities 120 accordingly. In one embodiment, plan explainer 110 adjusts the product mix ratios, inventory levels at various stocking points, and sourcing of one or more supply chain entities 120 based on various root causes of goals and/or objective violations. In addition, or as an alternative, at least one of the one or more supply chain entities 120 transforms a state of the supply chain according to the one or more items by adjusting inventory levels of the one or more items according to the optimum inventory level. For example, plan explainer 110, places an order with a supplier, a manufacturer and/or a distribution center for the one or more items. Based on this order, a supplier provides one or more items to one or more manufacturers. The one or more manufactures then uses the one or more items during the manufacturing process to produce the one or more items and provides the one or more items to a distribution center. The distribution center then distributes the one or more items to one or more retailers and the method ends.

According to FIG. 9, an exemplary supply chain network model was described and a response to query for why demand was shorted is generated. According to some embodiments, plan explainer may model supply chain network with various plants, variables, starting materials, resources, and/or manufacturing stages as illustrated in the following example models.

Figure 10:
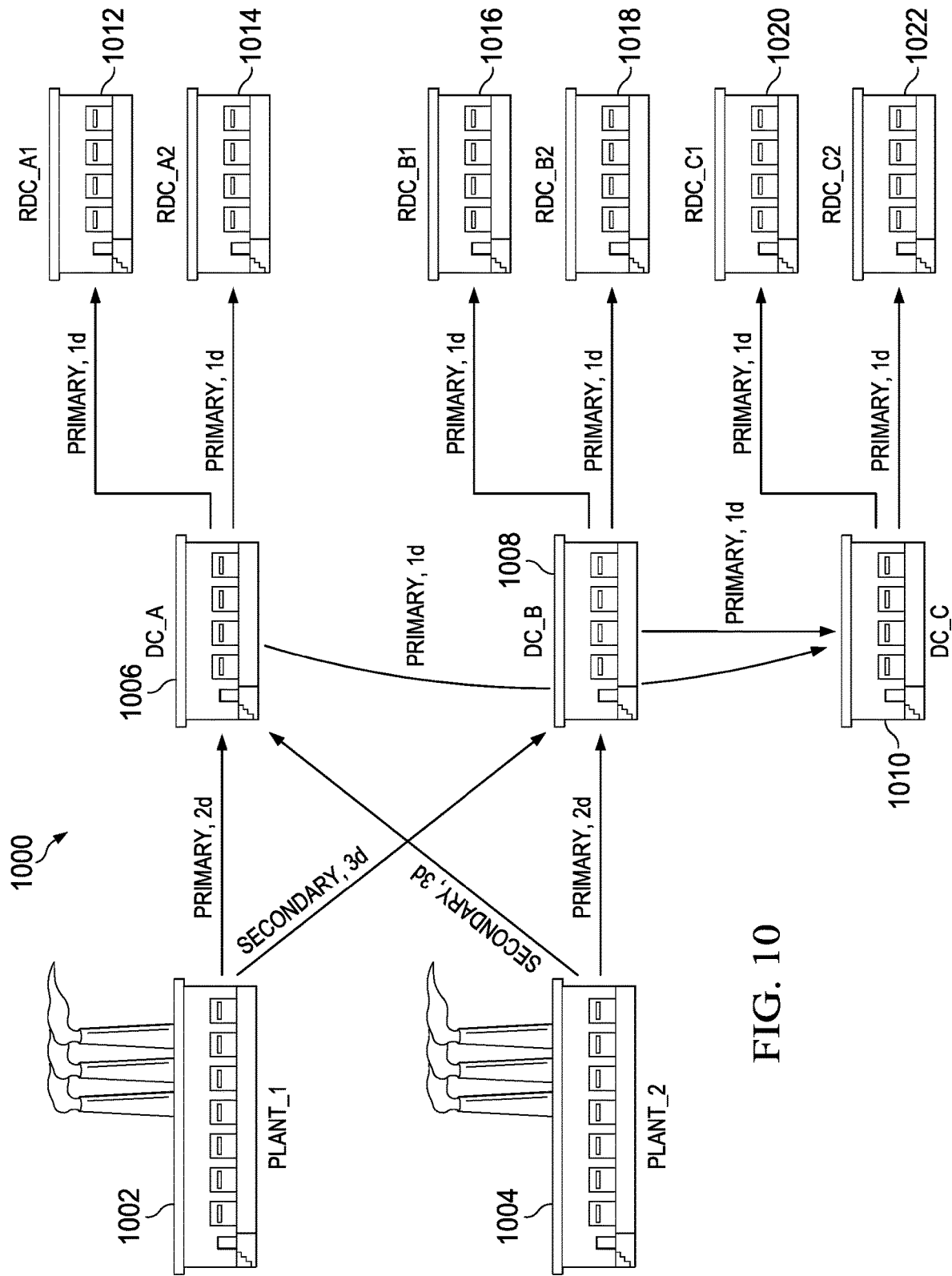
FIG. 10 illustrates an exemplary supply chain network model, according to a further embodiment.

FIG. 10 illustrates a second exemplary supply chain network model 1000 according to an embodiment. According to FIG. 10, plan explainer 110 models a second supply chain network with various distribution centers and lead times. The second supply chain network may comprise, for example, 2 Plants—Plant_1 1002 and Plant_2 1004; 3 Distribution Centers—DC_A 1006, DC_B 1008, and DC_C 1010, with various lead times to the various regional distribution centers and plants, Plant_1 1002, Primary—DC_A 1006—2d lead-time, Secondary—DC_B 1008—3d lead-time, Plant_2 1004, Primary—DC_B 1008—2d lead-time, Secondary—DC_A 1006—3d lead-time, DC_C 1010, Source—DC_A 1006 and DC_B 1008 (1d lead-time), and 6 Regional Distribution Centers (RDC's) (RDC_A1 1012 & RDC_A2 1014 (Source: DC_A 1006), (RDC_B1 1016 & RDC_B2 1018 (Source: DC_B 1008), (RDC_C1 1020 & RDC_C2 1022 (Source: DC_C 1010)).

For example, as illustrated, one or more items produced in the one or more plants, needs to be shipped to a distribution center, such as, for example, distribution center A, distribution center B, and distribution center C. From there the item may be transferred to a regional distribution center (RDC), such as A1, A2, B1, B2, C1, C2. Each of the arrows in the illustration demonstrate related prioritization, such as that plant 1 first ships to DC_A, that is the primary route and it takes two days to transfer. And transferring from plant 1 to DC_C is the secondary route, and obviously it could not transfer from plant 1 to DC_C because these are, for example, in separate geographical locations. According to the third supply chain model, there are resource constraints on intermediaries, there are different operations, there are different constraints for each of these that are modeled and each of the items can be distributed as well, which means the model takes into account that an item can move from distribution to RDCs.

According to some embodiments, plan explainer 110 receives input that specifies priorities or the proportion of procurement/manufacturing/distribution, costs for each of these, such as for example, inventory holding cost, transportation cost, margin, and the like. In addition, or as an alternative, an objective may be, for example, a high priority customer whose demand must be met at any cost, or a low priority customer whose demand must be met only if it is profitable or profitable to a certain amount. Returning to the query and analysis method 800 of FIG. 8, plan explainer 110 may determine, in response to a query, if a demand was shorted based on the profit optimization, it may no longer be profitable at a particular location or distribution route or that a particular segment or cluster is more important.

To further explain the query and analysis method 800 of FIG. 8, a further example is now given in connection with the supply chain network model 1000 of FIG. 10. In the following example, plan explainer 110 may receive a query, "Why is mintime not respected for buffer Item1-at-RDC_B1 and Item1-at-RDC_B2?"

In response to this query, plan explainer 110 may then parse the log generated from the plan optimization and explanation method 600 and stored in the plan explanation datastore 226. In this example, the log may comprise the following lines:

Line(3392) PLAN_ANALYSIS_1_PRESLV_BDCHG_UB: var CR000014T012X012 index 3118 UB 1e+20 changed to 500

Line(3625) PLAN_ANALYSIS_1_PRESLV_BDCHG_UB: var CR000019T014X014 index 3351 UB 1e+20 changed to 500

Line(7549) PLAN_ANALYSIS_2_VAR_FIX: var CR000014T012X012 index 3118 fixed at 500

Line(7550) PLAN_ANALYSIS_2_VAR_FIX: var CR000014T012X012 index 3118 fixed at 500

Line(7555) PLAN_ANALYSIS_2_VAR_FIX: var CR000019T014X014 index 3351 fixed at 500

Line(7556) PLAN_ANALYSIS_2_VAR_FIX: var CR000019T014X014 index 3351 fixed at 500

Line(16135) PLAN_ANALYSIS_3_OBJ_COEF: var CR000019T014X014 index 3351 objCoef 1000.96398926 value 500

Line(16139) PLAN_ANALYSIS_3_OBJ_COEF: var CR000014T012X012 index 3118 objCoef 1000.96954346 value 500

Plan explainer 110 may parse the query to identify that a particular inventory (time-based safety stock) was not expected for a particular buffer (Item1-at_RDC_B1 and Item1-at_RDC_B2). This query comprises a violated business objective and a particular location and item for which the question was raised.

The query and analysis method 800 begins by identifying the relevant variables for answering the query. Based on the query, plan explainer 110 identifies the relevant variables as CR variables which should have been minimized. Plan explainer 110 identifies the following two variables, CR000014T012X012 and CR000019T014X014, for example in the following lines:

Line(3392) PLAN_ANALYSIS_1_PRESLV_BDCHG_UB: var CR000014T012X012 index 3118 UB 1e+20 changed to 500

Line(3625) PLAN_ANALYSIS_1_PRESLV_BDCHG_UB: var CR000019T014X014 index 3351 UB 1e+20 changed to 500

As can be seen from this example, the variables are identified based on the stored data from the LP formulation. For example, according to some embodiments, plan explainer 110 stores a log as data of one or more variables corresponding to one or more supply chain entities and/or one or more corresponding objective violations. Based on the stored variables and the associations with the supply chain entity and/or the objective violation, plan explainer 110 identifies the relevant variables from the stored data in the log.

Next, plan explainer 110 determines the objective responsible for optimizing the variable. In this example, a first objective function is identified which changed the bound to 500, and again for the second variable from infinity to 500.

At a further action, plan explainer 110 determines that in the first objective function only the upper bound was changed and constrained to 500, and further determines that for the second objective function, the variables were fixed to 500. Plan explainer 110 thus determines that both the upper and lower bounds were modified.

Line(7549) PLAN_ANALYSIS_2_VAR_FIX: var CR000014T012X012 index 3118 fixed at 500

Line(7550) PLAN_ANALYSIS_2_VAR_FIX: var CR000014T012X012 index 3118 fixed at 500

Line(7555) PLAN_ANALYSIS_2_VAR_FIX: var CR000019T014X014 index 3351 fixed at 500

Line(7556) PLAN_ANALYSIS_2_VAR_FIX: var CR000019T014X014 index 3351 fixed at 500

The method 800 continues where plan explainer 110 determines a third objective function which was supposed to be minimized. Plan explainer 110 thereby determines that a positive objective coefficient was supposed to minimize the variable. Based on this, plan explainer 110 identifies that objective 3 was supposed to minimize any mintime violation, but the objectives above were responsible for the violation at this objective site.

Based on this determination, plan explainer 110 further determines the profit optimization oblevel (second object), which was the objective function number 2, is causing the safety stock violation. And because there were no other records found, plan explainer 110 determines that no additional input is required to meet this oblevel independently, and that no additional material or capacity are needed to hold the safety stock. Finally, plan explainer 110 may generate a response to the query identifying, that a profit optimization oblevel is causing the safety stock violation, and that no additional input is required to meet this oblevel independently.

To further explain the query and analysis method 800 of FIG. 8, a further example is now given. Plan explainer 110 receives a query, "Why is the item3 demand short and late?" After plan explainer 110 receives the query, the violation analyzer 216 identifies the variable or variables associated with item3 at activity 802. The violation analyzer 216 identifies the variable for item3 as [AMT00000200001001] by searching the log generated by the optimization and explanation method 600. The log may comprise the following lines:

Item 'Item3**Delop_Item_3' (2), layer 'Layer2', bucket 2001-01-03 (3), maxBack −1, index 1 Raw req 2: rank 2 due 2001-01-03 (promise 2001-01-03) for 1800 units DelOp 'Delop_Item_3', opindex 1, var AMT00000200001001, demand 1800, price 0

According to some embodiments, plan explainer associates item3 in the log with a delivery operation [Delop_Item_3], a layer [Layer2], a date[2001-01-03], a rank [rank 2], a due date [due 2001-01-03], a demand [demand 1800], and a price [0]. In this example, item3 is the only item listed; however, embodiments contemplate any suitable number of items in the log according to particular supply chain models. Once the item is associated with a variable (in this example, item3 with variable [AMT00000200001001]), violation analyzer 216 searches for any additional variables associated with operations for item3. For example, the log may comprise the following lines:

Item 'Item3**Delop_Item_3', layer 'Layer2', bucket 3 (2001-01-03), maxBack −1, index 1, delOp 'Delop_Item_3', opindex 1
RequestIndex 1, bucket 3 (2001-01-03) (earliest consumption 3), var F000002000010031, price 0
RequestIndex 1, bucket 4 (2001-01-04) (earliest consumption 4), var F000002000010041, price 0
RequestIndex 1, bucket 5 (2001-01-05) (earliest consumption 5), var F000002000010051, price 0

Here, the following lines identify further variables associated with the demand for item3 made on different dates. In this example, the following variables are identified from the exemplary log above: [F000002000010031], [F000002000010041], and [F000002000010051], which represent demand for item3 potentially satisfied on different dates. Using a log search process, such as multigrep, violation analyzer 216 may identify the following records of the log associated with the four variables associated with item3:

Line(36) PLAN_ANALYSIS_1_PRESLV_BDCHG_UB: var AMT00000200001001 index 41 UB 18000 changed to 7200
Line(40) PLAN_ANALYSIS_1_PRESLV_BDCHG_UB: var F000002000010031 index 45 UB 1e+20 changed to 1800
Line(41) PLAN_ANALYSIS_1_PRESLV_BDCHG_UB: var F000002000010041 index 46 UB 1e+20 changed to 2400
Line(42) PLAN_ANALYSIS_1_PRESLV_BDCHG_UB: var F000002000010051 index 47 UB 1e+20 changed to 3000
Line(86) PLAN_ANALYSIS_2_PRESLV_BDCHG_UB: var AMT00000200001001 index 41 UB 7200 changed to 1800
Line(88) PLAN_ANALYSIS_2_PRESLV_FIX: var F000002000010031 index 45 fixed presolved at 0
Line(89) PLAN_ANALYSIS_2_PRESLV_BDCHG_UB: var F000002000010041 index 46 UB 2400 changed to 600
Line(90) PLAN_ANALYSIS_2_PRESLV_BDCHG_UB: var F000002000010051 index 47 UB 3000 changed to 1200
Line(129) PLAN_ANALYSIS_3_PRESLV_BDCHG_LB: var AMT00000200001001 index 41 LB 0 changed to 600
Line(130) PLAN_ANALYSIS_3_PRESLV_BDCHG_LB: var F000002000010051 index 47 LB 0 changed to 600
Line(132) PLAN_ANALYSIS_3_OBJ_COEF: var AMT00000200001001 index 41 objCoef −3 value 1200
Line(152) PLAN_ANALYSIS_4_PRESLV_FIX: var AMT00000200001001 index 41 fixed presolved at 1200
Line(153) PLAN_ANALYSIS_4_PRESLV_FIX: var F000002000010041 index 46 fixed presolved at 600
Line(154) PLAN_ANALYSIS_4_PRESLV_FIX: var F000002000010051 index 47 fixed presolved at 600
Line(156) PLAN_ANALYSIS_4_OBJ_COEF: var F000002000010031 index 45 objCoef 3.20000005 value 0
Line(157) PLAN_ANALYSIS_4_OBJ_COEF: var F000002000010041 index 46 objCoef 23.60000038 value 600
Line(158) PLAN_ANALYSIS_4_OBJ_COEF: var F000002000010051 index 47 objCoef 44 value 600

In order to explain the syntax of the above records from the log data found in connection with the variables associated with item3, an explanation in connection with Line(36) is now given.

Each record may comprise a line number [line(36)] that identifies the line of the record in the log data. Each record may comprise a number or other identifiers that uniquely identifies that record. Each record may comprise a prefix that identifies the stage or method associated with storing that record in the log. Here, each of the records is associated with plan analysis [PLAN_ANALYSIS]. After the prefix is a number that identifies the objective function for which the information was collected. For example, the record of Line (36) was associated with objective function 1 [_1_]. Line (130), for example, was associated with objective function 3 [_3_].

The next portion of the record identifies which activity is associated with the record. For the record of line(36), the record is associated with changing the upper bound during a pre-solve activity [PRESLV_BDCHG_UP]. The record of line(129), for example, is associated with changing the lower bound during a pre-solve [PRESLV_BDCHG_LB]. Other activities identified by the records include modifying the objective coefficient [OBJ_COEF] and fixing variables during the pre-solve [PRESLV_FIX]. Although four particular examples are described, embodiments contemplate any suitable syntax for recording the activity associated with storing a record.

Each record may also comprise an index number, which may comprise a unique number given to a variable that makes it easy to track in the mathematical model created by a solver. The solver may or may not retain the names assigned to variables, so index may provide a search key to locate particular variables in the log. According to some embodiments, the index is not used because each variable is identified directly in the log. However, according to other embodiments, including large datasets, search for a variable by an index number provides for faster searching of the log.

Based on the above, the record associated with line(36) may be parsed as a pre-solve bound change during the bound strengthening associated with the first objective function, the upper bound for the variable [var AMT00000200001001] was changed from 18,000 to 7,200 [UB 18000 changed to 7200].

For different records, different activities will have different data in the records. Some of the records, for example, are variable changes, and others are variable fixing. For variable fixing, when the record states that only one value is fixed (for example, record of line(88) that states [presolved at 0]), this indicates that the upper bound and the lower bound are at the same value, which, in this example, is zero.

Now that the syntax for the records is explained, the rest of the query and analysis method 800 for the above example, (i.e. the query, "Why is the item3 demand short and late?") will now be explained. Because the variables have been identified in the above explained activity (activity 802), the method 800 continues to activity 804.

At activity 804, violation analyzer 216 locates the objective responsible for optimizing the one or more variables. To locate the objective, violation analyzer 216 identifies the first instance where the objective coefficient is greater than 0 [OBJ_COEFF>0]. In the exemplary log data above, violation analyzer 216 searches for OBJ_COEFF associated with the variable for item3. Violation analyzer 216 then locates the record associated with Line(132) which states that objeCoef is −3 and identify the objective associated with this record, objective 3 [_3_]. In the example above, the demand satisfaction is supposed to be maximized, but the objective is minimization of 'Amount Not Satisfied Violation'. To maintain the uniformity in calculation and representation, all the oblevels are modelled as minimization objective functions. If any oblevel actually requires maximization, the objective coefficients are multiplied with −1 and the objective function is converted to minimization without any loss of generality.

Continuing with activity 804, violation analyzer 216 identifies the desired value by setting the desired value equal to the unfixed lower bound, if the objective coefficient is greater than 0 [and the objective is minimization], otherwise the desired value is the unfixed upper bound. For a maximization objective, if the objective coefficient is less than 0, the desired value is the unfixed lower bound, otherwise the desired value is the unfixed upper bound. Because the objective coefficient is less than 0 and the objective is a minimization, the desired value is equal to the unfixed upper bound.

To find the unfixed lower bound, violation analyzer 216 searches the log for the bound information itself. In the following exemplary log data, the bound information is identifies as associated with the initial demand bound.

Item Item3**Delop_Item_3' (2), layer 'Layer2', bucket 2001-01-03 (3), maxBack −1, index 1 Raw req 2: rank 2 due 2001-01-03 (promise 2001-01-03) for 1800 units DelOp 'Delop_Item_3', opindex 1, var AMT00000200001001, demand 1800, price 0

The initial demand bound for the associated variable is 1800 [demand 1800]. So the desired value is equal to the unfixed upper bound, or 1800.

Once the desired value is identified, the method continues to activity 806, where violation analyzer 216 identifies the objective that modified the identified bound. Based on the exemplary log data described above, violation analyzer 216 may determine that because the variable is not fixed in the objective level in which it was supposed to be fixed, violation analyzer 216 looks to the previous objective. Because the bound change is associated with the upper bound, violation analyzer 216 searches the log for the records associated with a bound change of the upper bound. [BDCHG_UB] and identifies the associated objective. According to the log data above, the violation analyzer 216 would identify the objective as objective 1 [_1_] for variable [AMT00000200001001].

Continuing to activity 808, violation analyzer 216 determines if the objective full presolve status is equal to zero or not [_OBJ_FULLPRESOLVE_STATUS=0] for the objective that was supposed to maximize the value.

Therefore, violation analyzer 216 may analyze and check the relaxation analysis for objective 3, which may be determined to be the opt objective because the coefficient is nonzero. In this instance, violation analyzer 216 searches the log for the identified objective (in this example, objective 3 [PLAN_ANALYSIS_3].

Searching through the log file, violation analyzer 216 locates records for the full pre-solve which are associated with the relaxation analysis for objective 3. According to an embodiment, violation analyzer 216 may identify the following records:
PLAN_ANALYSIS_3_OBJ_FULLPRESOLVE_ORIG_UB_CHG: var CAP0001BD00T001 index 15 origUB 600 currValue 18000
PLAN_ANALYSIS_3_OBJ_FULLPRESOLVE_ORIG_UB_CHG: var CAP0002BD00T001 index 20 origUB 600 currValue 18000

The above records identify capacities associated with objective 3. For the above capacities, [CAP0001BD00T001] and [CAP0002BD00T001], the records indicate that in the relaxed solve, the capacity variables (which are two of the input variables that may have an effect on the final outcome) were changed from an original upper bound of 600 [origUB 600] to 18,000 [currValue 18000].

This indicates that for the particular demand associated with item3 to be fully satisfied, the variables associated with the located capacities need to be changed to 18,000 from 600. The syntax of the capacity variables also identifies the date and the resource associated with the capacity. For example, [CAP00001] identifies the capacity, [BD00] identifies the type of the variable (such as, for example, whether the capacity is regular capacity or whether the capacity is available with first level overtime), and [T001] identifies the date.

Once the capacities associated with the objective are identified, violation analyzer 216 may report that answer for the query to the user. Continuing with the example and exemplary log data above, the query had two parts, "Why is the demand of item3 shorted?" and "Why is the demand of item3 lated?"

Beginning with the first part of the query, violation analyzer 216 determines why the demand of item3 is shorted by first identifying the date on which the AMT variable located above was due. If the log data indicates that the AMT variable [here, a demand for item3] is met on a particular day, then the demand for that item will be met on that day as well. Although the embodiments describe associating a variable or a demand with a particular date, embodiments contemplate associating variables and demand with any suitable time period, such as a minute, hour, week, month, year, or any other like period of time.

To determine if the demand is met, violation analyzer 216 looks to the flow variables identified at activity 802 to see if the flow is sufficient to meet the demand on a given day. As explained in connection with the syntax of the variables above, each of the flow variables may contain syntax that indicates the data associated with the flow variable.

For example, the flow variable, [F000002000010031], indicates from which date the material was supplied to meet the associated demand. The "F" portion of the flow variable [F000002] indicates the end item for which the flow is needed. A due date portion of the syntax [00001] indicates on which date the material is due, and a supply date portion of the syntax [003] identifies the date the material was supplied.

Therefore, parsing the flow variables in connection with the AMT variable, violation analyzer 216 identifies the dates associated with each demand. For example, the flow variable [F000002000010031] may indicate a material supply available on Jan. 3, 2001, the flow variable [F000002000010041] may indicate a material supply available on Jan. 4, 2001, and the flow variable [F000002000010051] may indicate a material supply available on Jan. 5, 2001. This information may be found solely by parsing the syntax associated with the variable and stored in the log file.

Therefore, to answer the first part of the query, violation analyzer 216 identifies that the variables for the capacities [CAP0001BD00T001] and [CAP0002BD00T001] have capacity constraints of 600, and need to be increased to 18,000 to satisfy the demand. Hence, and answer to the first part of the query ("Why is the demand of item3 short?") may be presented to the user as "because of capacity constraints on Cap1 and Cap2."

Moving to the second part of the query, "Why is the demand of item3 lated?" violation analyzer 216 will analyze the flow variables. For example, the flow variable [F000002000010031] index 45 was fixed presolved at zero. When analyzing this information, violation analyzer 216 may determine that, for objective 2 [PLAN_ANALYSIS_2], this variable [F000002000010031] was fixed at zero. Objective 2 was an oblevel, which was supposed to minimize the lateness for the demand, but had higher priority than the demand for item3. Because the demand was supposed to be maximized at objective 3, which was meant to satisfy the demand for item3, objective 2 needed to satisfy a higher priority demand, and as close to the due date as possible, and that prevents the demand for item3 from being fully met (i.e. shorted). Therefore, in response to the user query "Why is the demand of item3 lated?" the violation analyzer 216 may present a response to the user that "the demand was bound to be lated because of backlog satisfaction of demand layer 1." According to some embodiments, a layer may be assigned to a demand to indicate the priority of the demand.

Based on these two parts of the query, in response to the user query "Why is the demand for item3 shorted and lated?" the violation analyzer may analyze the log file to present to the user a response that "Demand is shorted because of capacity constraints on Cap1 and Cap2 and demand is lated because of a higher priority demand on the due date"?

In response to the received response, plan explainer 110 may change the constraints on capacity 1 and capacity 2 and/or change the priority of the objective functions so that the demand for item3 is met. Additionally, plan explainer 110 may place orders, restock inventory, or alter stock at one or more supply points in the supply change so that the demand for item3 is not shorted and/or late. According to some embodiments, plan explainer 110 may look at the end item demand for item3 and increase the material requirement or capacity requirement upward to meet the deficiency indicated by the response generated in the query and analysis method 800. After the material or capacity is increased to meet the deficiency indicate, plan explainer 110 may solve at a higher level layer and resolve the supply chain problem to identify further supply chain violations in response to a second query.

To further explain the query and demand analysis method 800 of FIG. 8, a further example is now given. At activity 802, in response to a query, violation analyzer 216 identifies the variables associated with the query. For example, violation analyzer 216 may receive the exemplary query, "Why is the inventory of item3 carried forward?" or, similarly, "Why is the inventory of item3 on a certain buffer with a certain item carried forward from a first date to a second date?"

In response to the query, violation analyzer 216 may locate the following log data:

| Buffer 'Item3' (3) inf N, level 2: | | | | | |
|---|---|---|---|---|---|
| Produce: 2001-01-01 (1) | 250 | 250 | OP000005T001 'Int_B_to_Item_3' | 250 | 1 |
| Produce: 2001-01-02 (2) | 250 | 500 | OP000005T002 'Int_B_to_Item_3' | 250 | 1 |
| Produce: 2001-01-03 (3) | 150 | 650 | OP000005T003 'Int_B_to_Item_3' | 150 | 1 |
| Deliver: 2001-01-03 (3) | −100 | 550 | F000002000010031 Delop_Item_3' | 100 | 1 |

Based on this exemplary log data generated during the linear programming optimization and explanation method 600, violation analyzer 216 locates the records associated with the materials produced and consumed for the buffer associated with item3. For example, the first record of the above log data indicates that on Jan. 1, 2001 [2001-01-01] a certain operation of the supply chain [OP000005] which is arranged by the number [T001] will produce 250 units (indicated by the first [250] in the record) in bucket 1 [1] and the total inventory will be 250 units (indicated by the second [250] in the record).

By way of a further example, the second record of the above log indicates that on Jan. 2, 2001 [2001-01-02] a certain operation of the supply chain [OP000005] which is arranged by the number [T002] will produce 250 units (indicated by the first [250] in the record) in bucket 1 [1] and the total inventory will be 500 units (indicated by the second [250] in the record). The third record indicates that an additional 150 units are produced [150] and the total inventory is increased to 650 [650]. The fourth record indicates that 100 units are consumed [−100] by a delivery operation [Deliver] on Jan. 3, 2001 [2001-01-03], and the total inventory is decreased to 550 units [550]. The fourth record is associated with a flow variable [F000002000010031], which indicates that this consumption of inventory goes directly into demand satisfaction.

After the variable is identified, the method 800 continues to activity 804. At activity 804, violation analyzer 216 identifies the objective responsible for optimizing the variable. In this example, the objective identified is objective 7 [_7_], as indicated in the following exemplary log data:

PLAN_ANALYSIS_7_OBJ_BOUND_RELAX_START for oblevel inventory
PLAN_ANALYSIS_7_OBJ_FULLPRESOLVE_STATUS: status 0
PLAN_ANALYSIS_7_OBJ_FULLPRESOLVE_CURR_UB_CHG: var SOUTMIN0001T001 index 51 currUB 0 currValue 250
PLAN_ANALYSIS_7_OBJ_FULLPRESOLVE_CURR_UB_CHG: var SOUTMIN0001T002 index 53 currUB 0 currValue 250
PLAN_ANALYSIS_7_OBJ_FULLPRESOLVE_CURR_UB_CHG: var SOUTMIN0001T003 index 55 currUB 0 currValue 50

The inventory objective during the linear programming optimization was to minimize any objective in any inventory carried forward. This is associated with objective7. For purposes of clarity, the entire log data indicating how objective7 was identified is omitted from this disclosure. However, according to embodiments, objective7 may be identified from the log data consistent with the above method and examples.

After the objective responsible for optimizing the variable is identified, the method continues to activity 806, where the bound associated with objective7 is identified. Here, based on the above log data, objective7 is associated with relaxing the bound. [OBJ_BOUND_RELAX_START for oblevel inventory].

Continuing to activity 808, the violation analyzer 216 determines if the objective full presolve status is equal to zero or not [_OBJ_FULLPRESOLVE_STATUS=0] for the objective that was supposed to minimize the inventory carried forward. The log data indicates that the full presolve status is equal to 0. This is indicated in the log data [PLAN_ANALYSIS_7_OBJ_FULLPRESOLVE_STATUS: status 0].

When the status is 0, this indicates that the decision made at activity 808 is YES, which indicates an adjustment to the material or the capacity, and this objective (objective7) should be fully met.

The method 800 continues to activity 810, where violation analyzer 216 identifies required input flexing. The input flexing is identified by, for every input variable, violation analyzer 216 checks each _OBJ_FULLRESOLVE_ORIG_UB_CHG to determine the modified bounds in each objective. Based on the exemplary log data above, the violation analyzer identifies the following records:

PLAN_ANALYSIS_7_OBJ_FULLPRESOLVE_CURR_UB_CHG: var SOUTMIN0001T001 index 51 currUB 0 currValue 250

PLAN_ANALYSIS_7_OBJ_FULLPRESOLVE_CURR_UB_CHG: var SOUTMIN0001T002 index 53 currUB 0 currValue 250

PLAN_ANALYSIS_7_OBJ_FULLPRESOLVE_CURR_UB_CHG: var SOUTMIN0001T003 index 55 currUB 0 currValue 50

These records indicate that for three variables, [SOUTMIN0001T001], [SOUTMIN0001T002], and [SOUTMIN0001T003], the upper bounds for the variables were changed. For the first variable, [SOUTMIN0001T001], the upper bound was changed from 0 to 250. For the second variable, [SOUTMIN0001T002], the upper bound was changed from 0 to 250. For the third variable, [SOUTMIN0001T003], the upper bound was changed from 0 to 50.

By way of example and not by limitation, in the example provided each of the variables may be associated with total resource utilization, or the resource outsourcing minimization. For each resource having an associated capacity, an objective may be to minimize the utilization of the resource, for example, a machine. In the example provided, a minimum utilization may be associated with the resource to, for example, comply with a contract for minimum use of the machine, which, even if the machine is not utilized to the minimum capacity, the supply chain entity comprising the machine may still be required to pay a certain amount for the use of the machine.

Based on these bound changes, violation analyzer 216 traces the bound changes of the variable to identify a response to the query. In the current example, the bound changes may be associated with an objective function for optimizing a resource to ensure that there is a minimum utilization. This may be identified by the syntax of the identified variables. For example, for the third identified variable, [SOUTMIN0001T003], violation analyzer 216 may identify that the capacity is identified by the syntax [0001] and the date it is used is identified by the syntax [T003].

This indicates that that the capacity resource utilization on capacity 1 is forcing the inventory to be carried forward because the current upper bound was set at 50, but the actual value according to the original plan should have been zero.

Because of the super-optimization on the relaxed solve of the linear program, the actual value of the upper bound is identified by violation analyzer 216 as 50. This corresponds to the resource for which the minimum utilization is ensured. Therefore, this variable is forced to be suboptimal, which is why the inventory is carried forward. Therefore, violation analyzer 216 may respond to the query that "Resource utilization on capacity Cap1 is forcing the inventory to be carried forward."

Additionally, according to some embodiments, the log data may be mined for further information relating to the supply chain plan and the linear optimization. For example, each of the identified variables [SOUTMIN0001T001], [SOUTMIN0001T002], and [SOUTMIN0001T003], for objective7 are related to the same capacity. This is indicated by the syntax [0001] in the variable name. In addition, each of the capacities are associated with different dates. This is indicated in the final portion of the variable syntax [T001], [T002], and [T003]. So the response to the query may be refined based on this window associated with Capacity 1 to identify the capacity at each date (January 1, January 2, and January 3) and demonstrate that due to the minimum resource utilization, the inventory is forced.

The identification of capacity 1 forcing the inventory being carried forward due to a resource utilization is not identified quickly or at all with other linear programming analysis methods which have difficulty (either by being extremely slow or being completely unable to identify) the association between objectives in solving a linear program for a supply chain planning problem. According to embodiments, plan explainer 110 is particularly adept at identifying business objectives that are constricting or preventing supply or demand, but which are not obviously linked and which may not be provided by simple material and capacity netting.

For example, in the example just provided, there is no obvious link between the particular objective function and the current upper bound change if not for the system and method provided in this disclosure. In addition to identifying the link, plan explainer 110 indicates a detailed and precise link between objective 7 and the upper bound change.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A system, comprising:
a computer, comprising a processor and a database, the computer configured to generate a response to a query for a goal violation by:
solving a hierarchy of objective functions comprising one or more business objectives, using one or more hierarchical optimizations;

storing explanation data by adding one or more prefixes to output lines to generate a log syntax, the explanation data stored as a processing log according to the one or more hierarchical optimizations in the database, by:
  storing in the database an unfixed upper bound and an unfixed lower bound according to a model and according to a preprocessing of constraints;
  at each objective level optimization, storing in the database an objective coefficient;
  at each variable fixing, inspecting a reduced cost and value, and when the reduced cost is greater than 0, fixing and storing in the database a lower bound;
  when the reduced cost is less than 0, fixing and storing in the database a upper bound;
  comparing the fixed lower bound and the fixed upper bound;
  when the fixed upper bound and the fixed lower bound tighten the bounds of a linear programming problem based on the hierarchy of objective functions, storing in the database the tightened bound; and
  when the fixed upper bound and the fixed lower bound are the same, fixing and storing the variable of the objective function;
performing bound relaxation on the linear programming problem by:
  fixing the variable to the unfixed upper bound when the objective coefficient is less than 0;
  fixing the variable to the unfixed lower bound when the objective coefficient is greater than 0;
  fixing the lower bound to zero and the upper bound to infinity, when the objective coefficient is zero and the variable is of an input type;
  fixing the lower bound to the unfixed lower bound and the upper bound to the unfixed upper bound, when the objective coefficient is zero and the variable is not an input type; and
  storing in the database any of the fixed upper bounds and fixed lower bounds;
displaying a graphical user interface graphically illustrating one or more supply chain components;
receiving one or more selections of the one or more supply chain components by a user to iteratively build a query from the one or more selections to generate a machine readable query;
executing the machine readable query in the form of a multigrep log search process to search the processing log;
identifying records stored in the processing log based on the log syntax to identify explanation data corresponding to the machine readable query;
retrieving the explanation data and generating the response to the machine readable query for the goal violation by parsing the retrieved explanation data;
calculating an optimum inventory level based on the generated response; and
automatically adjusting inventory levels of one or more items according to the optimum inventory level.

2. The system of claim 1, wherein retrieving the explanation data comprises: generating a plan analysis output comprising fixed variables and fixed bounds recorded by the computer; filtering variables by type; retrieving variables related to a queried type of variable; scanning the plan analysis output to identify when the queried variable was fixed; determining which oblevel correlates to a maximizing or minimizing of the queried variable; identifying the first objective which contains the queried variable; when the objective coefficient is positive, identifying the objective which changed the lower bound of the variable; when the objective coefficient is negative, identifying the objective which changed the upper bound of the variable; and performing a relaxation analysis.

3. The system of claim 2, wherein the response to the query is identified by:
  identifying one or more variables associated with an item identified in the query;
  identifying an objective function associated with a bound change; and
  identifying an objective function associated with modifying the bound.

4. A computer-implemented method, comprising:
solving a hierarchy of objective functions comprising one or more business objectives, using one or more hierarchical optimizations;
storing explanation data by adding one or more prefixes to output lines to generate a log syntax, the explanation data stored as a processing log according to the one or more hierarchical optimizations in the database, by:
  storing in the database an unfixed upper bound and an unfixed lower bound according to a model and according to a preprocessing of constraints;
  at each objective level optimization, storing in the database an objective coefficient;
  at each variable fixing, inspecting a reduced cost and value, and when the reduced cost is greater than 0, fixing and storing in the database a lower bound;
  when the reduced cost is less than 0, fixing and storing in the database a upper bound;
  comparing the fixed lower bound and the fixed upper bound;
  when the fixed upper bound and the fixed lower bound tighten the bounds of a linear programming problem based on the hierarchy of objective functions, storing in the database the tightened bound; and
  when the fixed upper bound and the fixed lower bound are the same, fixing and storing the variable of the objective function;
performing bound relaxation on the linear programming problem by:
  fixing the variable to the unfixed upper bound when the objective coefficient is less than 0;
  fixing the variable to the unfixed lower bound when the objective coefficient is greater than 0;
  fixing the lower bound to zero and the upper bound to infinity, when the objective coefficient is zero and the variable is of an input type;
  fixing the lower bound to the unfixed lower bound and the upper bound to the unfixed upper bound, when the objective coefficient is zero and the variable is not an input type; and
  storing in the database any of the fixed upper bounds and fixed lower bounds;
displaying a graphical user interface graphically illustrating one or more supply chain components;
receiving one or more selections of the one or more supply chain components by a user to iteratively build a query from the one or more selections to generate a machine readable query;
executing the machine readable query in the form of a multigrep log search process to search the processing log;

identifying records stored in the processing log based on the log syntax to identify explanation data corresponding to the machine readable query;

retrieving the explanation data and generating a response to the machine readable query for a goal violation by parsing the retrieved explanation data;

calculating an optimum inventory level based on the generated response; and automatically adjusting inventory levels of one or more items according to the optimum inventory level.

5. The computer-implemented method of claim 4, wherein retrieving the explanation data comprises: generating a plan analysis output comprising fixed variables and fixed bounds recorded by the computer; filtering variables by type; retrieving variables related to a queried type of variable; scanning the plan analysis output to identify when the queried variable was fixed; determining which oblevel correlates to a maximizing or minimizing of the queried variable; identifying the first objective which contains the queried variable; when the objective coefficient is positive, identifying the objective which changed the lower bound of the variable; when the objective coefficient is negative, identifying the objective which changed the upper bound of the variable; and performing a relaxation analysis.

6. The computer-implemented method of claim 5, wherein the response to the query is identified by:

identifying one or more variables associated with an item identified in the query;

identifying an objective function associated with a bound change; and identifying an objective function associated with modifying the bound.

7. A non-transitory computer-readable medium embodied with software, the software when executed configured to:

solve a hierarchy of objective functions comprising one or more business objectives, using one or more hierarchical optimizations;

store explanation data by adding one or more prefixes to output lines to generate a log syntax, the explanation data stored as a processing log according to the one or more hierarchical optimizations in the database, by:

storing in the database an unfixed upper bound and an unfixed lower bound according to a model and according to a preprocessing of constraints;

at each objective level optimization, storing in the database an objective coefficient;

at each variable fixing, inspecting a reduced cost and value, and when the reduced cost is greater than 0, fixing and storing in the database a lower bound;

when the reduced cost is less than 0, fixing and storing in the database a upper bound;

comparing the fixed lower bound and the fixed upper bound;

when the fixed upper bound and the fixed lower bound tighten the bounds of a linear programming problem based on the hierarchy of objective functions, storing in the database the tightened bound; and when the fixed upper bound and the fixed lower bound are the same, fixing and storing the variable of the objective function;

perform bound relaxation on the linear programming problem by:

fixing the variable to the unfixed upper bound when the objective coefficient is less than 0;

fixing the variable to the unfixed lower bound when the objective coefficient is greater than 0;

fixing the lower bound to zero and the upper bound to infinity, when the objective coefficient is zero and the variable is of an input type;

fixing the lower bound to the unfixed lower bound and the upper bound to the unfixed upper bound, when the objective coefficient is zero and the variable is not an input type; and storing in the database any of the fixed upper bounds and fixed lower bounds;

display a graphical user interface graphically illustrating one or more supply chain components;

receive one or more selections of the one or more supply chain components by a user to iteratively build a query from the one or more selections to generate a machine readable query;

execute the machine readable query in the form of a multigrep log search process to search the processing log;

identify records stored in the processing log based on the log syntax to identify explanation data corresponding to the machine readable query;

retrieve the explanation data and generate a response to the machine readable query for a goal violation by parsing the retrieved explanation data;

calculate an optimum inventory level based on the generated response; and automatically adjust inventory levels of one or more items according to the optimum inventory level.

8. The non-transitory computer-readable medium of claim 7, wherein the software retrieves the explanation data by: generating a plan analysis output comprising fixed variables and fixed bounds recorded by the computer; filtering variables by type; retrieving variables related to a queried type of variable; scanning the plan analysis output to identify when the queried variable was fixed; determining which oblevel correlates to a maximizing or minimizing of the queried variable; identifying the first objective which contains the queried variable; when the objective coefficient is positive, identify the objective which changed the lower bound of the variable; when the objective coefficient is negative, identify the objective which changed the upper bound of the variable; and performing a relaxation analysis.

9. The non-transitory computer-readable medium of claim 8, wherein the response to the query is identified by:

identifying one or more variables associated with an item identified in the query;

identifying an objective function associated with a bound change; and identifying an objective function associated with modifying the bound.

* * * * *